United States Patent
Nagaraja et al.

(10) Patent No.: US 11,943,641 B2
(45) Date of Patent: Mar. 26, 2024

(54) SYSTEM AND METHOD FOR SELECTING RESOURCES TO TRANSMIT A BEAM FAILURE RECOVERY REQUEST

(71) Applicant: QUALCOMM Incorporated, San Diego, CA (US)

(72) Inventors: Sumeeth Nagaraja, Los Altos, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/088,310

(22) Filed: Nov. 3, 2020

(65) Prior Publication Data
US 2021/0051496 A1   Feb. 18, 2021

Related U.S. Application Data

(63) Continuation of application No. 16/126,888, filed on Sep. 10, 2018, now Pat. No. 10,880,761.
(Continued)

(51) Int. Cl.
*H04W 24/04* (2009.01)
*H04B 7/06* (2006.01)
(Continued)

(52) U.S. Cl.
CPC .......... *H04W 24/04* (2013.01); *H04B 7/0617* (2013.01); *H04B 7/0695* (2013.01);
(Continued)

(58) Field of Classification Search
None
See application file for complete search history.

(56) References Cited

U.S. PATENT DOCUMENTS 10,813,157 B1    10/2020   Bai et al.
2003/0219037 A1*   11/2003   Toskala ................. H04W 28/22
                                                 370/328
(Continued)

FOREIGN PATENT DOCUMENTS

CN    105850224 A    8/2016
CN    107005858 A    8/2017
(Continued)

OTHER PUBLICATIONS

Lenovo., et al., "NR Handover in Multi-Beam Operation", R2-1708977, Berlin, Germany, Aug. 21-25, 2017, pp. 1-3.
(Continued)

*Primary Examiner* — Alex Skripnikov
*Assistant Examiner* — Pamit Kaur
(74) *Attorney, Agent, or Firm* — QUALCOMM IP DEPT.; James Hunt Yancey, Jr.

(57) ABSTRACT

Aspects of the disclosure relate to beam failure recovery requests. In one example, a beam failure of a beam is detected, and a determination is made of which beam failure recovery resources to utilize for a beam failure recovery request based on a network configuration. The beam failure recovery request can be transmitted via beam failure recovery resources. In another example, a scheduling entity determines beam failure conditions associated with detecting a beam failure, and ascertains a network configuration for a scheduled entity that can include parameters associated with the beam failure conditions, as well as parameters associated with determining beam failure recovery resources or for transmitting a beam failure recovery request. Other aspects and features are also claimed and described.

44 Claims, 13 Drawing Sheets

Related U.S. Application Data

(60) Provisional application No. 62/557,106, filed on Sep. 11, 2017.

(51) Int. Cl.

| | | |
|---|---|---|
| *H04B 7/08* | (2006.01) | |
| *H04B 17/318* | (2015.01) | |
| *H04L 1/1812* | (2023.01) | |
| *H04L 1/1867* | (2023.01) | |
| *H04W 36/00* | (2009.01) | |
| *H04W 72/04* | (2023.01) | |
| *H04W 72/12* | (2023.01) | |
| *H04W 72/54* | (2023.01) | |
| *H04W 76/18* | (2018.01) | |
| *H04W 76/19* | (2018.01) | |
| *H04W 28/18* | (2009.01) | |

(52) U.S. Cl.
CPC ........... *H04B 7/088* (2013.01); *H04B 17/318* (2015.01); *H04L 1/1816* (2013.01); *H04L 1/189* (2013.01); *H04W 36/0055* (2013.01); *H04W 72/04* (2013.01); *H04W 72/12* (2013.01); *H04W 72/54* (2023.01); *H04W 76/18* (2018.02); *H04W 76/19* (2018.02); *H04W 28/18* (2013.01)

(56) References Cited

U.S. PATENT DOCUMENTS

| | | | |
|---|---|---|---|
| 2016/0353510 | A1 | 12/2016 | Zhang et al. |
| 2017/0231011 | A1 | 8/2017 | Park et al. |
| 2017/0251460 | A1* | 8/2017 | Agiwal ............... H04B 7/0617 |
| 2018/0006770 | A1 | 1/2018 | Guo et al. |
| 2018/0219604 | A1 | 8/2018 | Lu et al. |
| 2018/0302889 | A1* | 10/2018 | Guo ....................... H04B 7/088 |
| 2018/0323856 | A1* | 11/2018 | Xiong ................. H04W 74/004 |
| 2019/0037423 | A1 | 1/2019 | Yu et al. |
| 2019/0053294 | A1* | 2/2019 | Xia .................... H04W 72/0413 |
| 2019/0082334 | A1 | 3/2019 | Nagaraja et al. |
| 2019/0182870 | A1 | 6/2019 | Shih et al. |
| 2019/0260458 | A1 | 8/2019 | Zhou et al. |
| 2019/0268869 | A1 | 8/2019 | Akkarakaran et al. |
| 2019/0268893 | A1 | 8/2019 | Tsai et al. |
| 2019/0281588 | A1 | 9/2019 | Zhang et al. |
| 2019/0289588 | A1 | 9/2019 | Akkarakaran et al. |
| 2019/0306765 | A1 | 10/2019 | Cirik et al. |
| 2019/0306924 | A1 | 10/2019 | Zhang et al. |
| 2020/0107331 | A1 | 4/2020 | Tsai et al. |
| 2020/0186218 | A1* | 6/2020 | Wu .................... H04W 74/0833 |
| 2020/0274666 | A1* | 8/2020 | Zhang .................... H04B 7/086 |
| 2021/0105850 | A1 | 4/2021 | Bai et al. |
| 2022/0394800 | A1 | 12/2022 | Bai et al. |

FOREIGN PATENT DOCUMENTS

| | | |
|---|---|---|
| CN | 107079459 A | 8/2017 |
| CN | 110463310 A | 11/2019 |
| CN | 110546975 A | 12/2019 |
| CN | 110637496 A | 12/2019 |
| KR | 20170093071 A | 8/2017 |
| WO | 2013142222 A1 | 9/2013 |
| WO | 2017024516 A1 | 2/2017 |
| WO | 2017151876 A1 | 9/2017 |
| WO | 2018141303 A1 | 8/2018 |
| WO | 2018148552 A1 | 8/2018 |
| WO | 2018170516 A2 | 9/2018 |
| WO | 2018174667 A1 | 9/2018 |
| WO | 2018190617 A1 | 10/2018 |
| WO | 2018227464 A1 | 12/2018 |
| WO | 2018170516 A3 | 2/2019 |
| WO | 2019027294 A1 | 2/2019 |
| WO | 2019032882 A1 | 2/2019 |
| WO | 2019047948 A1 | 3/2019 |
| WO | WO-2019047948 A1 * | 3/2019 ........... H04B 7/0626 |

OTHER PUBLICATIONS

Mediatek Inc: "Aspects for UE-Initiated Beam Recovery", R1-1702730, 3GPP TSG RAN WG1 Meeting #88, Athens, Greece Feb. 13-17, 2017, 5 Pages.
RAN1: "LS on NR Beam Management", R2-1707629, 3GPP TSG RAN WG2#99, Berlin, Germany, Aug. 21-25, 2017, 3 Pages.
Samsung: "NR Beam Recovery Procedure", 3GPP Draft, R2-1703712, 3GPP TSG-RAN WG2 2017 RAN2#97bis Meeting, NR Beam Recovery Procedure, 3rd Generation Partnership Project (3GPP), Mobile Competence Centre; 650, Route Des Lucioles; F-06921 Sophia-Antipolis Cedex; France vol. RAN WG2, No. Spokane, USA; Apr. 3, 2017-Apr. 7, 2017, Apr. 3, 2017 (Apr. 3, 2017), 6 Pages, XP051245520, Retrieved from the Internet: URL: http://www.3gpp.org/ftp/Meetings_3GPP_SYNC/RAN2/Docs/ [retrieved on Apr. 3, 2017].
Taiwan Search Report—TW107131864—TIPO—dated Apr. 12, 2021.
Ericsson: "Beam Failure Recovery Mechanism", 3GPP TSG-RAN WG1 #89, R1-1708678, Hangzhou, China, May 15-19, 2017, pp. 1-8.
Samsung Electronics: "Handling Beam Failure Recovery Configuration Update", 3GPP TSG-RAN2 103, R2-1811325, Gothenburg, Sweden, Aug. 20-24, 2018, 4 Pages.
International Search Report and Written Opinion—PCT/US2018/050469—ISA/EPO—dated Dec. 7, 2018.
International Preliminary Report on Patentability—PCT/US2018/050469, The International Bureau of WIPO—Geneva, Switzerland, dated Mar. 26, 2020.
Lenovo, et al., "Resource Configuration for Beam Failure Recovery Request," 3GPP TSG-RAN WG2 Meeting#AH, 3GPP Draft; R2-1706905, Resource Configuration for Beam Failure Recovery Request, 3rd Generation Partnership Project (3GPP), Mobile Competence Centre; 650, Route Des Lucioles; F-06921 Sophia-Antipoli, vol. RAN WG2, No. Qingdao, China; Jun. 7, 2017-Jun. 29, 2017, Jun. 16, 2017, XP051306662, 4 pages, Retrieved from the Internet: URL: http://www.3gpp.org/ftp/tsg_ran/WG2_RL2/TSGR2_AHs/2017_06_NR/Docs/ [retrieved on Jun. 16, 2017].
Nokia et al., "Beam Recovery in NR", 3GPP TSG RAN WG1 Meeting NR#3, R1-1716500, Nagoya, Japan, Sep. 18-21, 2017, 7 Pages.
Samsung: "NR Beam Recovery Procedure", 3GPP TSG-RAN WG2 2017 RAN2#99 Meeting, R2-1709587, Berlin, Germany, Aug. 21-25, 2017, 5 Pages.
European Search Report—EP21188499—Search Authority—MUNICH—dated Oct. 19, 2021.
Huawei, et al., "Procedure Details for Beam Failure Recovery," 3GPP Draft, R1-1712224, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017, XP051315041, 12 Pages, Retrieved from the Internet: URL: http://www.3gpp.org/ftp/Meetings_3GPP_SYNC/RAN1/Docs/ [retrieved on Aug. 20, 2017].
Samsung: "Beam Failure Recovery", 3GPP TSG RAN WG1 Meeting #90, 3GPP Draft, R1-1713597, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 21, 2017-Aug. 25, 2017, 6 Pages, Aug. 20, 2017 (Aug. 20, 2017), XP051316397, Retrieved from the Internet: URL: http://www.3gpp.org/ftp/Meetings_3GPP_SYNC/RAN1/Docs/ [retrieved on Aug. 20, 2017] par.2-6.
Spreadtrum Communications: "Discussion on UE Initiated Recovery from Beam Failure", 3GPP Draft, 3GPP TSG RAN WG1 Meeting #90, R1-1713047, Discussion on UE Initiated Recovery from Beam Failure Final, 3rd Generation Partnership Project (3GPP), Mobile Competence Centre, 650, Route Des Lucioles, F-06921 Sophia-Ant, vol. RAN WG1, No. Prague, Czech Republic, Aug. 21,

(56) References Cited

OTHER PUBLICATIONS

2017-Aug. 25, 2017, Aug. 20, 2017 (Aug. 20, 2017), XP051315856, 6 Pages, Retrieved from the Internet: URL: http://www.3gpp.org/ftp/Meetings_3GPP_SYNC/RAN1/Docs/.
Spreadtrum Communications: "Discussion on UE Initiated Recovery from Beam Failure", 3GPP TSG RAN WG1 Meeting #89, 3GPP Draft, R1-1707782_Discussion On UE Initiated Recovery From Beam Failure_Final, 3rd Generation Partnership Project-(3GPP), Mobile Competence Centre, 650, Route Des Lucioles, F-06921 Sophia-Antip, vol. RAN WG1, No. Hangzhou, P.R. China, May 15, 2017-May 19, 2017, 5 Pages, May 14, 2017 (May 14, 2017), XP051272985.
ZTE: "Discussion on Mechanism to Recovery from Beam Failure", 3GPP TSG RAN WG1 Meeting #90, 3GPP Draft, R1-1712300 Discussion on Mechanism to Recovery from Beam Failure, 3rd Generation Partnership Project (3GPP), Mobile Competence Centre, 650, Route Des Lucioles, F-06921 Sophia-Antipolis C, vol. RAN WG1, No. Prague, Czechia, Aug. 21, 2017-Aug. 25, 2017, 9 Pages, Aug. 20, 2017 (Aug. 20, 2017), XP051315116, Retrieved from the Internet: URL: http://www.3gpp.org/ftp/Meetings_3GPP_SYNC/RAN1/Docs/ [retrieved on Aug. 20, 2017] par. 1-4.
FUJITSU: "Remaining PUCCH Spatial Filtering Issues on Beam Failure Recovery", R1-1810480, 3GPP TSG RAN WG1 Meeting #94bis, Chengdu, China, Oct. 8-12, 2018, pp. 1-3.
VIVO: "On Beam Failure Recovery Procedure", 3GPP TSG RAN WG1 Meeting #90, R1-1712839_ON Beam Failure Recovery, 3rd Generation Partnership Project (3GPP), Mobile Competence Centre; 650, Route Des Lucioles, F-06921 Sophia-Antipolis Cedex, France, vol. RAN WG1, No. Prague, P.R. Czech, Aug. 21, 2017-Aug. 25, 2017 Aug. 20, 2017, XP051315651, 5 pages.
Huawei, et al., "RAN2 Aspects of DL Beam Management", 3GPP TSG RAN WG2 #99, R2-1708695, Berlin, Germany, Aug. 21-25, 2017,4 Pages, Aug. 25, 2017.
Interdigital Inc: "On Remaining Details of Beam Failure Recovery", 3GPP TSG RAN WG1 Meeting #90, R1-1714142, No. Prague, P.R. Czech, Aug. 21, 2017-Aug. 25, 2017, 6 Pages, Aug. 12, 2017.
Mediatek Inc., "Beam Management and Beam Recovery in MAC", 3GPP TSG-RAN WG2 Meeting #99, R2-1707999, No. Berlin, Germany, Aug. 25, 2017-Aug. 25, 2017, 4 Pages, Aug. 11, 2017.
Mediatek Inc., et al., "RLM/RLF Considering Beam Failure Recovery", 3GPP TSG-RAN WG2 Meeting #99, R2-1707998, No. Berlin, Germany, Aug. 21, 2017-Aug. 25, 2017, 6 Pages, Aug. 11, 2017.
ERICSSON: "Mechanism to Recover from Beam Failure", 3GPP TSG-RAN WG1 #90, R1-1714293, Aug. 21-25, 2017, 11 Pages.

\* cited by examiner

SYSTEM AND METHOD FOR SELECTING RESOURCES TO TRANSMIT A BEAM FAILURE RECOVERY REQUEST

CROSS-REFERENCE TO RELATED APPLICATIONS

This application is a continuation of U.S. patent application Ser. No. 16/126,888 filed Sep. 10, 2018, which itself claims priority to and the benefit of U.S. provisional patent application No. 62/557,106 filed on Sep. 11, 2017, the entire contents of which are incorporated herein by reference in their entirety as if fully set forth below and for all applicable purposes.

TECHNICAL FIELD

The technology discussed below relates generally to wireless communication systems, and more particularly, to beam failure recovery requests. Embodiments can provide and enable techniques for selecting particular resources to utilize for transmitting a beam failure recovery request.

INTRODUCTION

In 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference. Beam communication failures between a base station and UE occur sometimes.

As the demand for mobile broadband access continues to increase, research and development continue to advance beamforming communication technologies, not only to meet the growing demand for mobile broadband access, but to advance and enhance user experiences with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduled entity are disclosed. In a particular example, a method is disclosed for obtaining beam failure recovery information that specifies at least one timing parameter to utilize during a beam failure event; determining, from the beam failure recovery information, at least one recovery resource to communicate a plurality of uplink messages during the beam failure event; and transmitting the plurality of uplink messages according to the at least one timing parameter.

In another aspect, an apparatus for wireless communication is disclosed, the apparatus including a processor; a transceiver communicatively coupled to the processor; and a memory communicatively coupled to the processor, wherein the processor and the memory are configured to: access beam failure recovery information that specifies at least one timing parameter for the processor to utilize during a beam failure event; determine, from the beam failure recovery information, at least one recovery resource that the processor and transceiver are to utilize during the beam failure event; and provide a plurality of uplink transmissions according to the at least one timing parameter that the processor utilizes to time each consecutive uplink transmission in the plurality of uplink transmissions.

In another example, a method directed towards a scheduled entity (e.g., a user equipment (UE)) is disclosed, the method including selecting which resources to utilize for transmitting a beam failure recovery request. In an example, the method includes detecting a beam failure of a beam used for communication between devices (e.g., a communication beam between a scheduled entity and another device (e.g., a scheduling entity)), and determining one or more beam failure recovery resources to utilize to transmit a beam failure recovery request. In this example, the beam failure recovery resources are determined based at least partially on a network configuration of the scheduled entity. The method further includes transmitting the beam failure recovery request via the beam failure recovery resources determined according to the network configuration.

In another aspect, a scheduled entity is disclosed. The scheduled entity can include a processor communicatively coupled to each of a detection circuitry, a determination circuitry, and a transmission circuitry. For this example, the detection circuitry can be configured to detect a beam failure of a beam used for communication between devices. The determination circuitry can be configured to determine one or more beam failure recovery resources to utilize to transmit a beam failure recovery request. In this example, the beam failure recovery resources are determined based at least partially on a network configuration of the scheduled entity. The transmission circuitry can be configured to transmit the beam failure recovery request via the beam failure recovery resources determined according to the network configuration.

Various aspects directed towards a scheduling entity a base station) are also disclosed. In a particular example, a method is disclosed for configuring a scheduled entity to transmit a beam failure recovery request. The method includes determining beam failure conditions associated with detecting a beam failure, and ascertaining a network configuration for the scheduled entity. In this example, the network configuration includes parameters associated with the beam failure conditions, as well as parameters associated with determining one or more beam failure recovery resources to utilize to transmit a beam failure recovery request. The method further includes transmitting the network configuration to the scheduled entity to facilitate a transmission of the beam failure recovery request by the scheduled entity via the one or more beam failure recovery resources.

In another aspect, a scheduling entity is disclosed. A scheduling entity can include a processor communicatively coupled to each of a beam failure circuitry, a network configuration circuitry, and a transmission circuitry. For this example, the beam failure circuitry can be configured to determine beam failure conditions associated with detecting a beam failure. The network configuration circuitry can be configured to ascertain a network configuration for a scheduled entity. The network configuration can include parameters associated with the beam failure conditions, as well as parameters associated with determining one or more beam failure recovery resources to utilize to transmit a beam failure recovery request and parameters associated with transmitting one or more beam failure recovery requests. The transmission circuitry can be configured to transmit the network configuration to the scheduled entity to facilitate a transmission of the beam failure recovery request by the scheduled entity via the one or more beam failure recovery resources.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
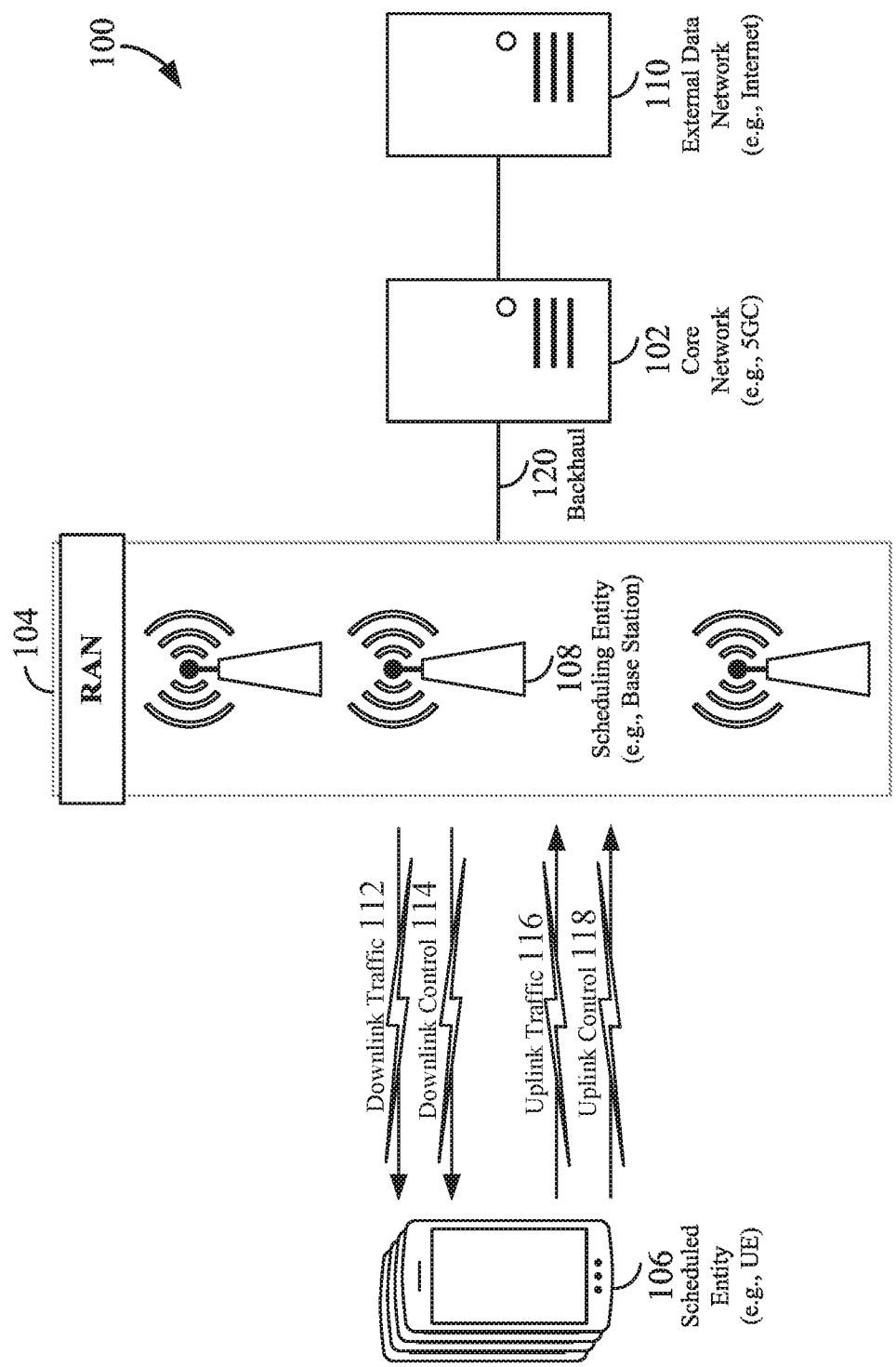
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In wireless communication systems, the path loss of a signal (i.e., the reduction in power density (attenuation) of an electromagnetic wave as it propagates through space) can be undesirably high and range may be limited. Beamforming is a technique that may be used to direct or concentrate the wireless signal to a desired direction to mitigate path loss and/or extend communication range. For a beamformed transmission, the amplitude and phase of each antenna in an array of antennas may be precoded, or controlled to create a desired (i.e., directional) pattern of constructive and destructive interference in a wavefront for a transmission. A beam may provide more energy in a certain direction to the receiver.

A base station may transmit one or more beam reference signals by sweeping in all directions so that a user equipment (UE) may identify a best "coarse" beam. Furthermore, the base station may transmit a beam refinement request signal so that the UE may track "fine" beams. If a "coarse" beam identified by the UE changes, the UE may inform the base station so that the base station may train one or more new "fine" beams for the UE. In some examples, when the UE can no longer "see" or loses the current beam, it is referred to as a beam failure. The UE may determine that the current beam experiences a beam failure when the signal quality or strength of the beam is below a predetermined threshold or not detected at all.

In a beam failure recovery process, the UE may transmit a beam failure recovery request to the base station. The beam failure recovery request may indicate a new beam (e.g., best "coarse" beam) detected by the UE from a set of beams that are periodically transmitted by the base station. The base station and UE may use the new beam to replace the current beam to maintain communication.

Various aspects of the disclosure are directed towards determining which of a plurality of uplink resources a UE should select for transmitting a beam failure recovery request. In some examples, these resources are selected according to a particular network configuration transmitted to the UE. Moreover, the disclosed aspects include aspects directed towards various network-based configurations of a UE, which provides the UE with rules for selecting particular uplink resources to utilize for transmitting a beam failure recovery request.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards. And in some cases, a mobile apparatus may also be referred as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE can be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC). a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MPS player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. in accordance with certain aspects of the present disclosure, the term. downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. A a scheduling entity (e.g., a base station 108) can allocate resources for communication among some or all devices and equipment within its service area or cell. Within the present disclosure and in some scenarios, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., a 5G Core Network designed to support throughput, latency, and mobility requirements of different service categories with the introduction of a Services Based Architecture (SBA) and Control and User Plane Separation (CUPS)). In other examples, the core network 102 may be configured according to a 4G evolved packet core (EPC), or any other suitable standard or configuration.

Figure 2:
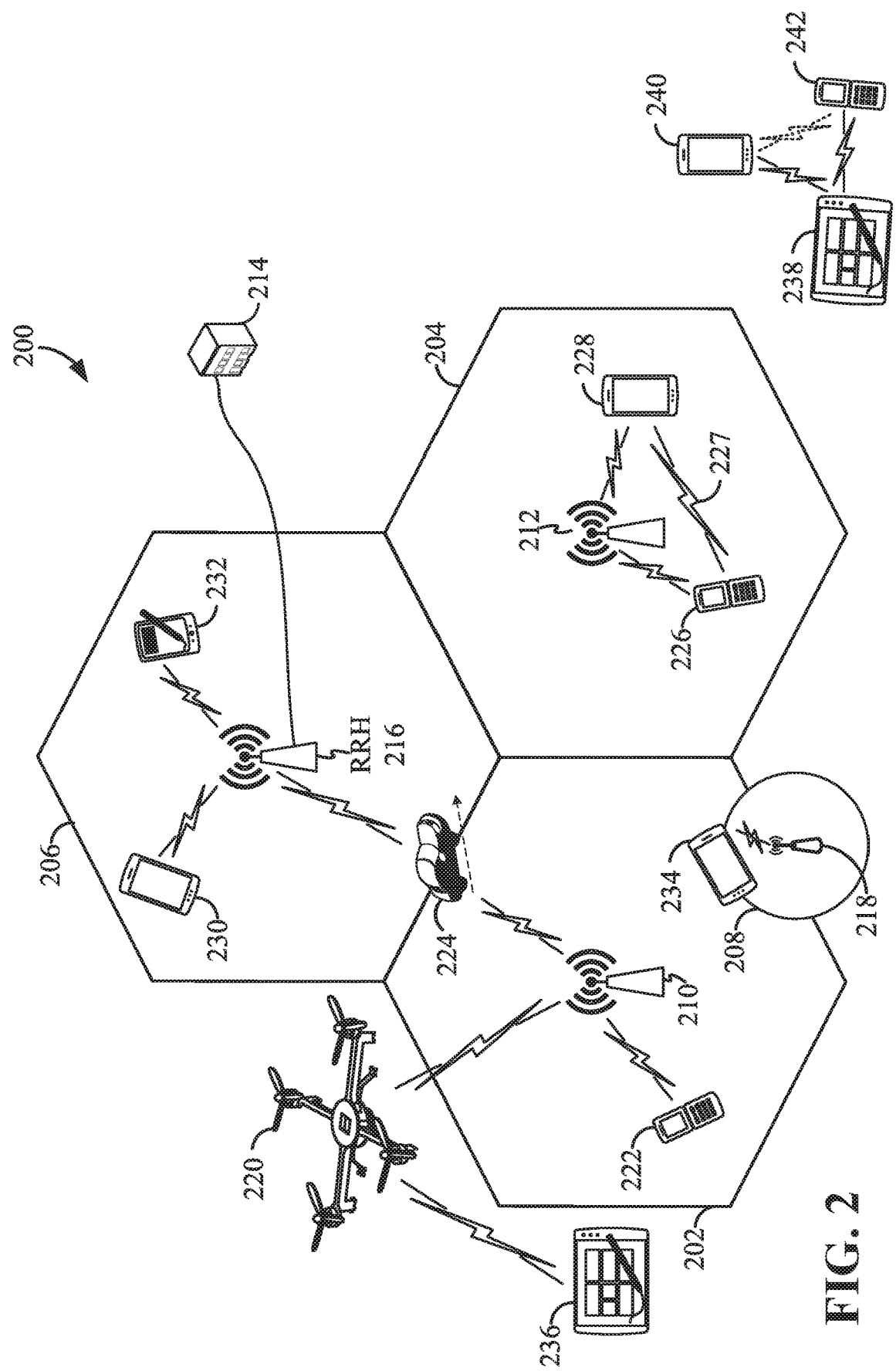
FIG. 2 is a conceptual illustration of an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The radio access network 200 may include any number of wireless base stations, nodes, and cells. As one example, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1, FIG. 2 further includes a quadcopter or drone 220, which may be configured to function as a base station. That is, in some examples, a cell may not necessarily be stationary, and the geographic area of the cell may move according to the location of a mobile base station such as the quadcopter 220. Though not shown, the drone 220 may also be other types of vehicles, including but not limited to, high altitude crafts, aerial-based vehicles, land-based vehicles, or water-going vehicles.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. in some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled. entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). Mobility features may also include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its seeing base station 210 indicating this condition. In response, the UE 224 may receive a handover command, and the UE may undergo a handover to the cell 206.

In a network configured for UL based mobility UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 22g, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (ISA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing That is, at some times the channel is dedicated for transmissions in one direction, while at other times the channel is dedicated for transmissions in the other direction, where the direction may change very rapidly, e.g., several times per slot.

Figure 3:
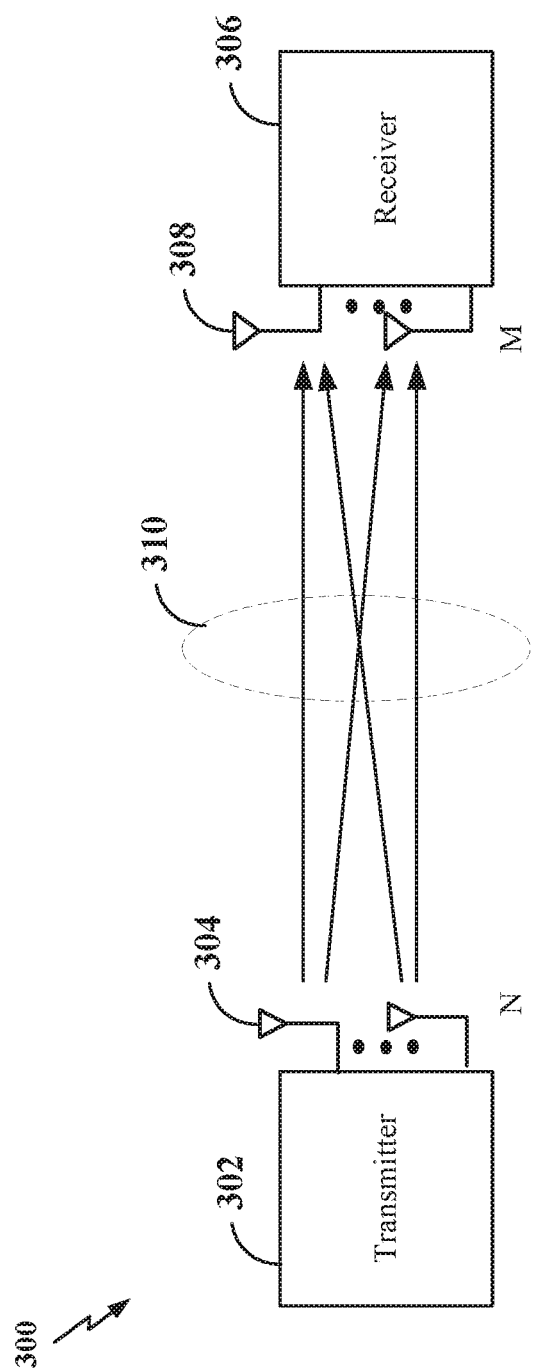
FIG. 3 is a block diagram illustrating a wireless communication system supporting multiple-input multiple-output (MIMO) communication according to some embodiments.

In some aspects of the disclosure, the scheduling, entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N'M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

According to 5G NR specifications, user data is coded using quasi-cyclic low-density parity check (LDPC) with two different base graphs. One base graph can be used for large code blocks and/or high code rates, and another base graph can be used otherwise. Of course, other use cases may be implemented with differing types of base graph combinations. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame generally refers to a logical segment of transmission of a particular time interval. As one example configuration, a frame can refer to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
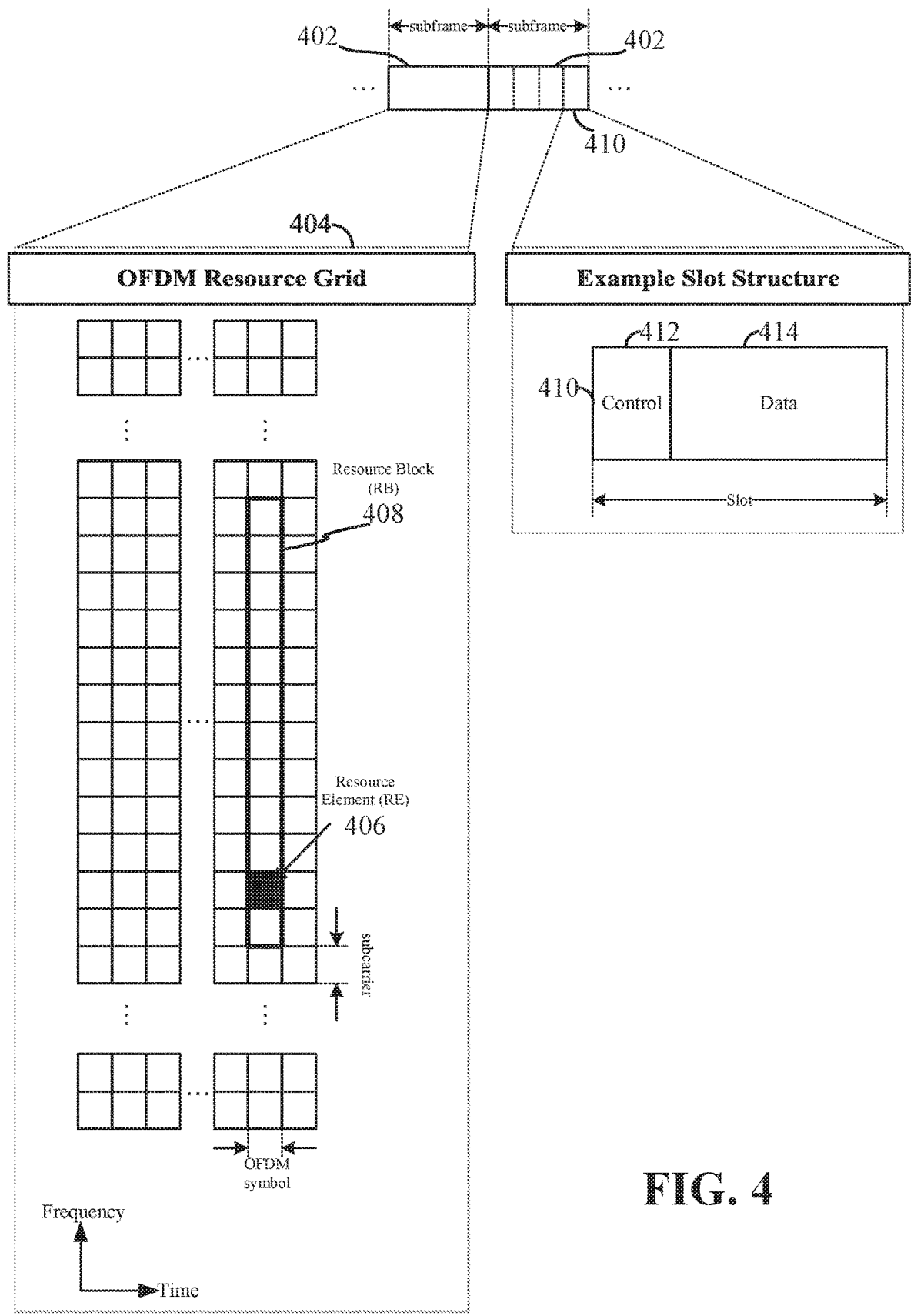
FIG. 4 is a schematic illustration of an organization of wireless resources in an air interface utilizing orthogonal frequency divisional multiplexing (OFDM) according to some embodiments.

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy. etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. This data traffic may be carried on one or more traffic channels, such as, for a DL transmission, a physical downlink shared channel (PUSCH), or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Exemplary Beamform Recovery Request Implementations

The unique challenges in some wireless systems is that of high path loss. New techniques such as hybrid beamforming (analog and digital), which are not present in 3G and 4G systems, have been contemplated to address this issue. Hybrid/beamforming permits multi-beam operation to users that can enhance link budget/Signal to Noise Ratio (SNR).

In a particular aspect of the disclosure, it is contemplated that a base station (e.g., eNB) and a user equipment (UE) communicate over active beams. Active beams are base station and UE beam pairs that carry data and control channels such as Physical Downlink Shared Channel (PUSCH), Physical Downlink Control Channel (PDCCH), Physical Uplink Shared Channel (PUSCH), and Physical Uplink Control Channel (PUSCH). In multi-beam operation, base station and UE active beam pairs may be misaligned (i.e., resulting in beam failure) due to beam switch failure or signal blockage. In such a scenario, the base station and UE cannot communicate over active beams (control or data).

A UE may detect beam/link failure by monitoring a subset of reference beam(s) (or signals) that are quasi-colocationed (QCLed) with the demodulation reference signal (DMRS) of a control channel. Upon detection of beam/link failure the UE will ascertain uplink (UL) resources (time, frequency and beam) to reconnect with the serving cell. In multi-beam operation, UL resources should be configured so that the network can create a receive beam in those directions.

FIGS. 5A through 5G are diagrams illustrating exemplary communications between a base station (BS) 504 and a UE 502 using beamformed signals according to some aspects of the disclosure. The base station 504 may be any of the base stations or scheduling entities illustrated in FIGS. 1 and 2, and the UE 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol or time may not be adjacent to one another. In some examples, the BS 504 may transmit more or less beams distributed in all directions (e.g., 360 degrees)

In one example, a beam set may contain eight different beams. For example. FIG. 5A illustrates eight beams 521, 522, 523, 524, 525, 526, 527, 528 for eight directions. In some aspects of the disclosure, the base station (BS) 504 may be configured to transmit at least one of the beams 521, 522, 523, 524, 525, 526, 527, 528 toward the UE 502. For example, the BS 504 can sweep or transmit in eight directions using eight ports (e.g., antenna ports) during a synchronization slot. The BS 504 may transmit a beam reference signal (BRS) for each beam in the different beam directions during the synchronization slot. The receiver can use the BRS to identify the beam by performing received power measurements on the BRS.

Figure 5B:
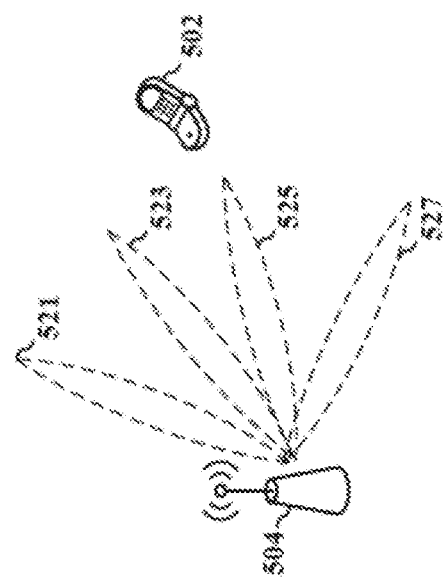
FIGS. 5A-5G illustrate examples of communications between a base station and a user equipment (UE) using beamforming according to some aspects of the disclosure.

Referring to FIG. 5B, the BS 504 may transmit a first set of beams 521, 523, 525, 527 in four directions. For example, the BS 504 may transmit a BRS in a synchronization slot of each of the transmitted beams 521, 523, 525, 527. In one example, these beams 521, 523, 525, 527 transmitted in four directions may be odd-indexed beams for the four directions out of the possible eight directions for the beam set. For example, the BS 504 may be capable of transmitting beams 521, 523, 525, 527 in directions adjacent to other beams 522, 524, 526, 528 that the BS 504 is configured to transmit. In this example, a configuration in which the BS 504 transmits beams 521, 523, 525, 527 for the four directions may be considered a "coarse" beam set, which enables the UE 502 to identify a beam corresponding to a general direction from which a signal from BS 504 is most strongly detected. A "fine" beam set can then be used, as discussed with reference to FIG. 5D below, to identify the particular beam from BS 504 that is most strongly detected by the UE 502.

Figure 5D:
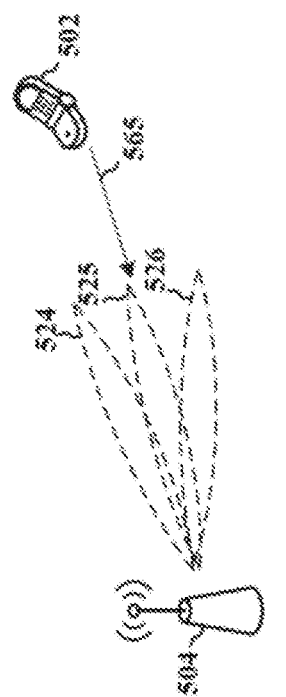
Figure 5A:
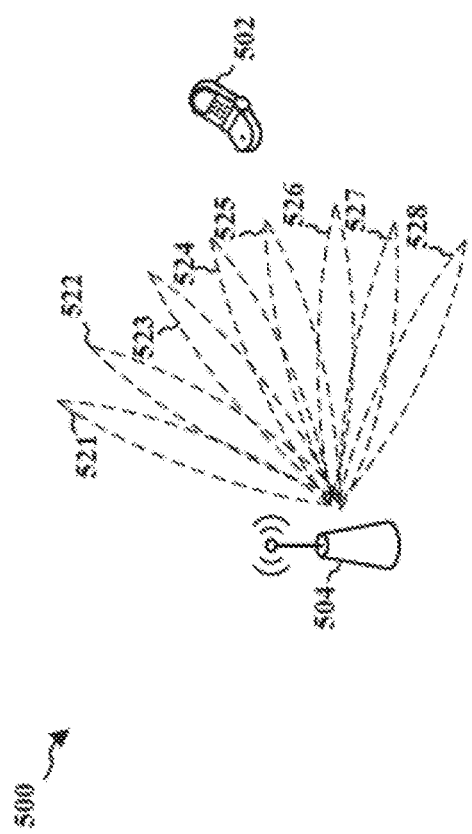
Figure 5C:
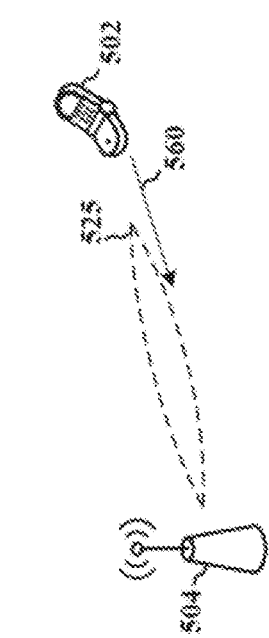

In FIG. 5C, the UE 502 may determine or select a beam or beam index that is strongest (e.g., strongest signal) or preferable in the course beam set. For example, the UE 502 may determine that the beam 525 carrying a BRS is strongest or preferable. The UE 502 may select a beam by measuring values for a received power or received quality associated with each of the first set of course beams 521, 523, 525, 527, comparing respective values to one another, and selecting the beam that corresponds to the greatest, highest, or best value. The selected beam may correspond to a beam index at the BS 504. The UE 502 may transmit an indication 560 of this beam index to the BS 504. In one example, the indication 560 may include a request to transmit a beam refinement reference signal (BRRS). One of ordinary skill would appreciate that the BRRS may be referred to by different terminology without departing from the present disclosure, such as a beam refinement signal, a beam tracking signal, or another term.

In various aspects of the disclosure, the UE 502 may determine a resource (e.g., time, frequency, and/or preamble) that corresponds to the selected beam or beam index. For example, a resource may include one of a radio frame, a subframe, a slot, a symbol, a subcarrier region, a preamble, a sequence, or an RE. Each resource may correspond to a value, for example, a radio frame index, a subframe index, slot index, a symbol index, or a subcarrier region. In one example, the UE 502 may have stored therein or may have access to a mapping or table (e.g., a lookup table) that indicates a respective resource (e.g., a value or index) to which the beam index corresponds. For example, the UE 502 may determine the beam index and then access a lookup table to determine a resource index or region that corresponds to the determined beam index.

In one example, the resource may be included in the PUCCH. in one example, the resource may be included in a slot associated with a random access channel (RACH). For example, the resource may be included in a bandwidth or carrier reserved for RACH transmission or Physical Random Access Channel (PRACH). The BS 504 may receive the indication 560, which may include a request for beam tracking (e.g., a request for a BRRS). Based on the indication 560, the BS 504 may determine the index corresponding to the selected beam 525. In one example, the indication 560 may be carried on a resource corresponding to the index of the selected beam 525. In one aspect of the disclosure, the BS 504 may have stored therein or may have access to a mapping or table (e.g., a lookup table) that indicates a respective resource (e.g., a value or index) to which the beam index corresponds. For example, the BS 504 may determine the resource on which the indication 560 is received and then access a lookup table to determine a beam index (e.g., the index corresponding to the selected beam 525) or resource region that corresponds to the determined beam index.

In FIG. 5D, the BS 504 may transmit a second set of beams based on the index included in the indication 560. For example, the UE 502 may indicate that a first beam 525 is strongest or preferable and, in response, the BS 504 may transmit a second set of beams 524, 525, 526 to the UE 502 based on the indicated beam index. In an aspect of the disclosure, the second set of beams 524, 525, 526 transmitted based on the indicated beam index may be closer (e.g., spatially and/or directionally) to the selected beam 525 than those other beams 521, 523, 527 of the first set of beams. The second set of beams 524, 525, 526 transmitted based on the indicated beam index may be considered a "fine" beam set. The separation between two adjacent beams in the fine beam set is smaller than that of the course beam set. In one example, a BRRS may be transmitted in each of the beams 524, 525, 526 of the fine beam set. In one example, the beams 524, 525, 526 of the fine beam set may be adjacent beams.

Based on one or more BRRSs received in the beams 524, 525, 526 of the fine beam set, the UE 502 may transmit a second indication 565 to the BS 504 to indicate a best, preferred, or selected "fine" beam or refined beam. In one example, the second indication 565 may use two (2) bits to indicate the selected beam. For example, the UE 502 may transmit an indication 565 that indicates an index corresponding to the selected beam 525. The BS 504 may then transmit to the UE 502 using the selected beam 525.

Figure 5G:
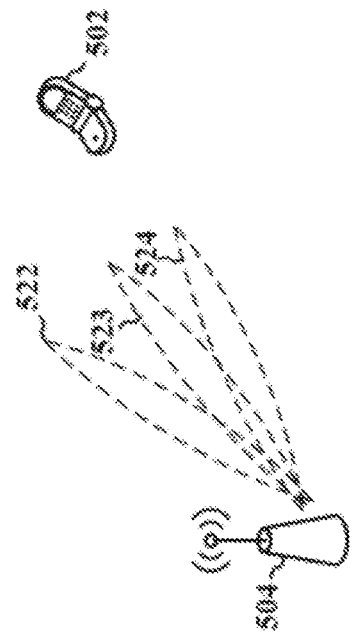
Figure 5E:
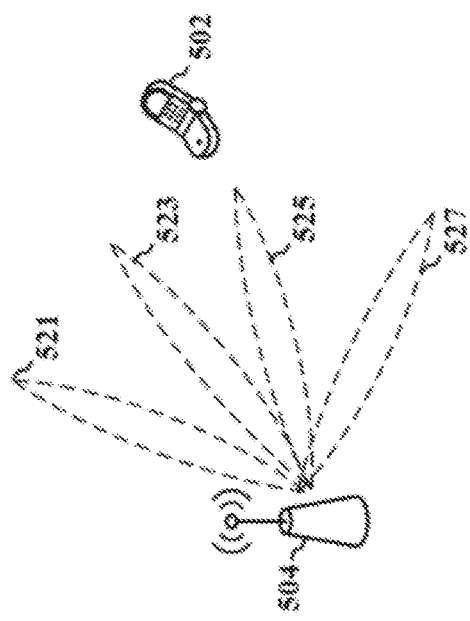

Referring to FIG. 5E, the BS 504 may transmit a BRS in a plurality of directions during a synchronization slot. In one example, the BS 504 may transmit the BRS continuously, e.g., even after the UE 502 has communicated the indication 565 of a selected beam 525 as described above. For example, the BS 504 may transmit simultaneously or sweep beams 521, 523, 525, 527 that each include a BRS (e.g., a "coarse" beam set). The BRS may be transmitted periodically or in a predetermined interval.

Figure 5F:
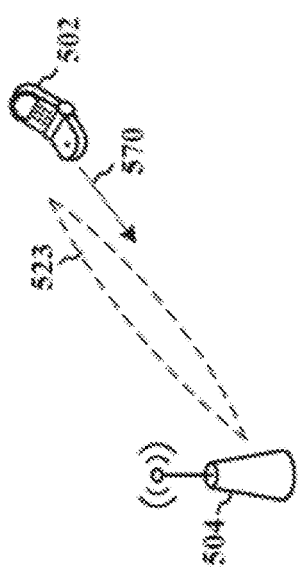

Referring to FIG. 5F, the quality of the selected beam 525 may deteriorate due to various reasons such that the UE 502 may no longer be able to see or communicate using the selected beam 525. Based on the BRS that is transmitted in the synchronization slot (e.g., continuously or periodically transmitted), the UE 502 may determine or find a new beam 523 on which to communicate with the BS 504, For example, the UE 502 may determine that the beam 523 carrying a BRS is strongest, best, or preferable. The UE 502 may select a beam by measuring values for a received power or received quality associated with each of the set of course beams 521, 523, 525, 527, comparing respective values to one another, and selecting the beam that corresponds to the greatest or best value. The selected beam may correspond to a beam index at the BS 504. The UE 502 may transmit a request 570 indicating this beam index to the BS 504. In one example, the indication 560 may include a beam failure recovery signal.

In various aspects of the disclosure, the UE 502 may determine a resource that corresponds to the selected beam index for transmitting the beam failure recovery signal. A resource may include one of a radio frame, a subframe, a slot, a symbol, a subcarrier region, or a preamble. Each resource may correspond to a value, for example, a radio frame index, a subframe index, a symbol index, or a subcarrier region. In one aspect of the disclosure, the UE may also transmit a beam adjustment request (BAR) to request the BS 504 to transmit a BRRS.

In one aspect of the disclosure, the UE 502 may have stored therein or may have access to a mapping or table (e.g., a lookup table) that indicates a respective resource (e.g., a value or index) to which the beam index corresponds. For example, the UE 502 may determine the beam index and then access a lookup table to determine a resource index or region that corresponds to the determined beam index.

In one aspect of the disclosure, the resource for transmitting the beam failure recovery request (e.g., request 570) may be included in resources associated with PRACH. In one example, the resource may be included in a bandwidth or carrier reserved for RACH transmission in PRACH. In one example, the resource for transmitting the beam failure recovery request may be a resource orthogonal to the resources of PRACH transmissions. In another example, the resource for transmitting the beam failure recovery request may be a contention-based RACH resource.

With respect to FIG. 5G, the BS 504 may receive the request 570 with a beam failure recovery request from the UE 502. The BS 504 may be configured to determine a beam index (e.g., a beam among the set of beams illustrated in FIG. 5E) based on at least one of the request and/or the resource carrying the request. For example, the request 570 may be carried on a resource determined to correspond to the index of the selected beam 523. In one example, the BS 504 may have stored therein or may have access to a mapping or table (e.g., a lookup table) that indicates a respective resource (e.g., a value or index) to which the beam index corresponds. For example, the BS 504 may determine the resource on which the request 570 is received and then access a lookup table to determine a beam index (e.g., the index corresponding to the selected beam 523) or resource region that corresponds to the determined beam index. in an example, an uplink beam during reception of the request 570 may be one of the first set of beams 521, 523, 525, 527.

In an aspect of the disclosure, the BS 504 may be configured to transmit a second set of beams 522, 523, 524 based on at least one of the request 570 and/or the resource on which the request 570 is carried. In an example, the BS 504 may be configured to determine, from the request 570 and/or the at least one resource carrying the request 570, a range of indexes. In an example, the BS 504 determines the beam index based on at least one subcarrier of the at least one resource on which the request 570 is carried.

In an aspect of the disclosure, the BS 504 determines, from within the range of indexes, the beam index based on a strength of a signal (e.g., reference signal) in different receive chains of the BS 504 through which the request 570 is received. For example, the BS 504 may receive the request 570 through a plurality of receive chains of the BS 504. The BS 504 may determine a signal strength of the request 570 for each receive chain through which the request 570 is received. The BS 504 may determine that each receive chain is associated with at least one beam index (e.g., the beam index for beam 523), and so the BS 504 may determine the beam index that corresponds to the receive chain in which the highest or strongest signal strength of the request 570 is detected.

In an aspect of the disclosure, the BS 504 may transmit, to the UE 502, an instruction to perform beam refinement. in one example, the instruction to perform beam refinement may be based on the selected beam 523 indicated to the BS 504 by the UE 502. In one example, the BS 504 may transmit one or more BRRSs in one or more synchronization slots of the second set of beams 522, 523, 524. The UE 502 may measure the BRRS in the scheduled slot(s) to determine the best beam of the BS 504, such as by measuring a respective value for a received power and/or received quality of each beam of the second set of beams 522, 523, 524, and comparing the measured values to one another to determine the highest values corresponding to a strongest beam of the second set of beams 522, 523, 524.

While the above described beam failure recovery processes are described with the UE transmitting the beam failure recovery request, without departing from the scope of the present disclosure, similar processes may be used by the base station to transmit a beam failure recovery request.

In general, it should be appreciated that aspects disclosed herein are in accordance with various agreements reached by the wireless communication industry. For instance, aspects disclosed herein are in accordance with a first agreement directed towards a UE beam failure recovery mechanism, which includes having the UE perform 1) a beam failure detection; 2) a new candidate beam identification; 3) a beam failure recovery request transmission; and 4) a monitoring of a gNB response to the beam failure recovery request.

With respect to beam failure detection, an agreement was reached that a UE shall monitor a beam failure detection reference signal (RS) to assess if a beam failure trigger condition has been met. it was further agreed that such beam failure detection RS at least includes a periodic channel state information reference signal (CSI-RS) for beam management e.g., a synchronization signal block (SS-block) within the serving cell can be considered, if the SS-block is also used in beam management as well). Trigger conditions for declaring beam failure was left for further study.

With respect to new candidate beam identification, an agreement was reached that the UE shall monitor a beam identification RS to find a new candidate beam. To this end, it was further agreed that such beam identification RS shall include a periodic CSI-RS for beam management, if it is configured by the network. If an SS-block is also used in beam management, the beam identification RS shall include a periodic CSI-RS and SS-blocks within the serving cell.

With respect to beam failure recovery request transmissions, an agreement was reached that information carried by a beam failure recovery request includes at least one of 1) explicit/implicit information identifying the UE and new gNB transmission beam information; 2) explicit/implicit information identifying the UE and whether or not a new candidate beam exists; or 3) for further study, information indicating a UE beam failure, additional information (e.g., new beam quality). This agreement further specifies that beam failure recovery request transmissions may comprise a down-selection between the following options: PRACH, PUCCH, a PRACH-like channel (e.g., having a different parameter for the preamble sequence from PRACH). This agreement also specifies that a beam failure recovery request resource/signal may be additionally used for a scheduling request.

With respect to the monitoring of a gNB response to a beam failure recovery request, an agreement was reached that the UE shall monitor a control channel search space to receive a gNB's response to a beam failure recovery request. To this end, it was left for further study whether the control channel search space can be the same or different from the current control channel search space associated with the serving BPLs. It was also left for further study how a UE would react if the gNB does not receive a beam failure recovery request transmission.

In a second agreement, the wireless communication industry identified various channels that may be used for beam failure recovery request transmissions. For instance, an agreement was reached to support beam failure recovery request transmissions via a non-contention based channel based on PRACH, which uses a resource orthogonal to resources of other PRACH transmissions, at least for the frequency division multiplexing (FDM) case. Other ways of achieving orthogonality, e.g., CDM/TDM with other PRACH resources, was left for further study. Also left for further study was whether or not to have a different sequence and/or format than those of PRACH for other purposes, and to what extent the retransmission behavior on this PRACH resource is similar to a regular RACH procedure.

In this second agreement, support using PUCCH for beam failure recovery request transmission was also contemplated. Here, it was left for further study whether PUCCH is with beam sweeping or not, wherein it was noted that this may or may not impact PUCCH design.

In this second agreement, it was also left for further study whether contention-based PRACH resources may be used as a supplement to contention-free beam failure recovery resources (e.g., from traditional RACH resource pool, whether a 4-step RACH procedure is used, etc.), wherein it was noted that contention-based PRACH resources may be used e.g., if a new candidate beam does not have resources for a contention-free PRACH-like transmission.

In a third agreement, the wireless communication industry agreed that, in order to receive a gNB response to a beam failure recovery request, a UE shall monitor the New Radio (NR) PDCCH with the assumption that the corresponding PDCCH DMRS is spatial QCLed with the reference signal of the UE-identified candidate beam(s). For further study was whether the candidate beam(s) is/are identified from a preconfigured set or not. It was also agreed that detection of a gNB's response to a beam failure recovery request would be during a time window that is supported. Here, various details were left for further study including: whether the time window is configured or pre-determined; whether the number of monitoring occasions is within the time window; and the size/location of the time window. In this third agreement, it was also agreed that, if there is no response detected within the window, the UE may perform a re-transmission of the request. Moreover, if a gNB response is not detected after a certain number of transmission(s), it was agreed that the UE shall notify higher layer entities, wherein the number of transmission(s) was left for further study as well as possibly including the use of a timer.

In a fourth agreement, the wireless communication industry agreed that the certain number of beam failure recovery request transmissions is network configurable by using any of various parameters. For instance, such parameters used by the network may include: the number of transmissions; whether the number is solely based on a timer; or a combination of a network-defined number of transmissions and a tinier. It was left for further study whether the beam failure recovery procedure is influenced by the radio link failure (RLF) event.

In a fifth agreement, the wireless communication industry agreed that, in case of an unsuccessful recovery from beam failure, the UE shall send an indication to higher layers, and refrain from further beam failure recovery. Such indication may include an indication of the relationship between the RLF and the unsuccessful beam failure recovery, if any (e.g. whether the beam failure recovery procedure influences or is influenced by the RLF event).

In a sixth agreement, the wireless communication industry agreed that a beam failure is declared only when all serving control channels fail. When a subset of serving control channels fail, it was agreed that this event should also be handled.

In a seventh agreement, the wireless communication industry agreed that, in addition to the periodic CSI-RS, the SS-block within the serving cell can be used for new candidate beam identification. To this end, it was further agreed that the following options can be configured for new candidate beam identification: 1) CSI-RS only, wherein an SS block will not be configured for new candidate beam identification; 2) SS block only, wherein the CSI-RS will not be configured for new candidate beam identification; or 3) CSI-RS+SS block.

Figure 6:
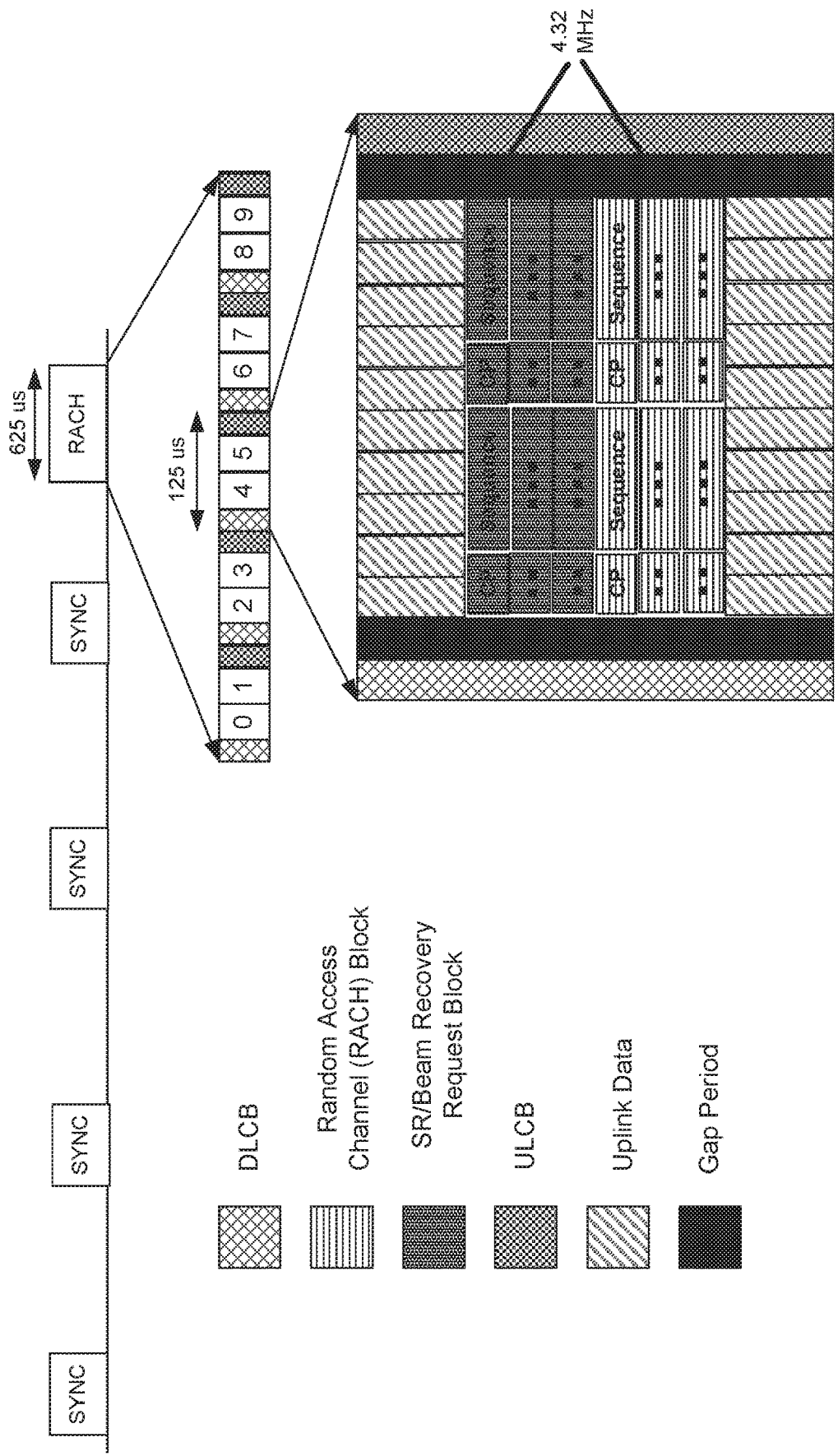
FIG. 6 illustrates an exemplary beam recovery and scheduling request block in the random access channel (RACH) slot in accordance with an aspect of the disclosure.

Referring next to FIG. 6, an exemplary beam recovery and scheduling request block in the RACH slot is illustrated in accordance with an aspect of the disclosure. 5G NR supports frequency division multiplexing of the beam recovery region and the RACH region. FIG. 6 thus shows a possible scenario frequency division multiplexing of the beam recovery region and the RACH region. If beam correspondence is available at the base station (BS), the BS may use a similar set of beams between transmitting downlink (DL) synchronization (SYNC) signals and receiving uplink (UL) RACH signals. If a UE loses its current working beam, it maps a good DL SYNC resource to the corresponding symbol index of the RACH slot. Namely, it selects one out of N subcarrier regions of the scheduling request (SR)/beam recovery request region and transmits in the selected symbol of the RACH slot.

In an aspect of the disclosure, it is contemplated that UEs can select a PRACH type signal to transmit a beam recovery request to a gNB. Table 1 below shows a possible numerology of the beam recovery request channel.

TABLE 1

Beam Recovery Request Numerology in Multi-beam Scenario

| Slot duration (us) | Subcarrier spacing (kHz) | Sequence length | Number of subcarrier regions in 50 MHz BW | Symbol duration (us) | Number of cyclic shifts per subcarrier region |
|---|---|---|---|---|---|
| 125 | 30 | 139 | 10 | 33.33 | ~100 |

It is contemplated that a BS can allow a much higher number of cyclic shifts to receive beam recovery requests in these slots. For example, if the delay spread is approximately 300 ns, the BS can allow approximately 100 orthogonal resources in each subcarrier region of the beam recovery request region because the sequence duration of the beam recovery request is 33.33 us. In a particular example where 50 MHz is proposed for minimum bandwidth in a multi-band scenario, since each beam recovery request region takes 4.32 MHz, there can be as high as 10 different subcarrier regions to transmit a beam recovery request. Some of these subcarrier regions may be used for a RACH message 1 (Msg1) preamble transmission and the BS can use some others for UL data transmission.

For example, even if a gNB uses six subcarrier regions to communicate a scheduling request or beam recovery request, six hundred orthogonal resources could be fit into these regions to convey the beam recovery request. Here, each UE could be allotted two different resources to transmit the SR or beam recovery request, for example.

In a first embodiment of the disclosure, it is thus contemplated that NR supports a RACH type sequence with higher number of cyclic shifts to convey beam recovery request to gNB through the non-contention based channel which is frequency division multiplexed with RACH.

An exemplary beam failure recovery request procedure in accordance with the disclosure has a number of features. in a multi-beam operation. a UE detects a failure of an active PDCCH beam by monitoring a DL reference signal that is QCLed with a control channel. When a beam failure event occurs, the network cannot reach the UE. Upon detection of a failure event, the UE selects a beam from the candidate beam set to transmit beam failure recovery request to the gNB. As previously stated, in NR, the following channels are supported for the transmission of beam failure recovery request: (1) Non-contention based channel based on PRACH, which uses a resource orthogonal to resources of other PRACH transmissions, at least for the FDM case; (2) PUCCH; and (3) Contention-based PRACH resources as supplement to contention-free beam failure recovery resources.

While contention-based PRACH incurs additional delay due to a four step RACH procedure, it may serve as a supplement to contention-free resources especially when the number of UEs in the system is large. Further, if the network does not configure any resources for beam failure recovery, then the UE may fall back to a contention-based PRACH to re-establish connection on the serving cell.

In a second embodiment of the disclosure, it is thus contemplated that NR shall support contention-based PRACH resources for the transmission of beam failure recovery requests.

Since NR supports multiple channels for the transmission of beam failure recovery requests, it is further contemplated that a non-contention based channel based on PRACH or contention-based PRACH resources as default be used. Namely, in a third embodiment of the disclosure, it is contemplated that NR shall support the configuration of a non-contention based channel based on PRACH or contention-based. PRACH resources for transmission of beam failure recovery request as default.

Additionally, it is contemplated that the network may also configure PUCCH for the transmission of beam failure recovery requests. However, if all the active control beam(s) fail, then the UE cannot find a suitable beam to transmit a beam failure recovery request to the gNB in those directions. Therefore, the network may configure a beam swept PUCCH that is QCLed with either NR-SS or CSI-RS.

In a fourth embodiment of the disclosure, it is thus contemplated that, in addition to non-contention based channel based on PRACH or contention-based PRACH, a base station can configure beam swept PUCCH that are QCLed with either NR-SS or CSI-RS for the transmission of beam failure recovery request.

It is also contemplated that, because a network may configure PUCCH in addition to non-contention based channel based on PRACH and contention based. PRACH, a priority rule may be used for the UE, to send the request. Since the network configures dedicated PUCCH resources, the UE may be configured to access this before trying others.

In a fifth embodiment of the disclosure, it is thus contemplated that, if gNB configures beam swept PUCCH resources in addition to non-contention based channel based on PRACH and contention based PRACH resources, then the UE prioritizes PUCCH over others.

Furthermore, it is contemplated that is may be beneficial for the beam-swept PUCCH to carry multiple bits to allow the UE to: 1) Provide information of multiple candidate beam(s) to facilitate gNB to configure multiple beam pair links; 2) Send scheduling request over beam failure recovery request; and 3) Request additional training on the downlink over the newly identified candidate beams.

Accordingly, in a sixth embodiment of the disclosure, it is thus contemplated that NR shall support multi-bit PUCCH to convey additional information during the transmission of beam failure recovery requests.

Next, two scenarios are considered: UL synchronized and UL out-of-sync for transmitting beam recovery requests over beam recovery request regions. With UL synchronization, the time alignment (TA) timer (that specifies the length of time UE is considered uplink time aligned with the TRP) is still valid. Based on latest NR agreements, if UE receives beam failure indication from physical layer, it could send beam recovery request using beam-swept PUCCH or non-contention based channel based on PRACH. And gNB will monitor these regions for beam recovery request. In UL synchronized case, a UE can send a single beam failure recovery request over PUCCH or non-contention based channel based channel over the UE selected candidate beam and wait for the response in the response window.

Accordingly, in a seventh embodiment of the disclosure, it is thus contemplated that the UE shall transmit one beam failure recovery request over PUCCH or non-contention based channel based on PRACH over a UE selected candidate beam before the end of monitored response window.

In an eighth embodiment of the disclosure, it is contemplated that the UE shall assume single response to beam failure recovery request message before the end of a monitored response window.

After the UE sends a beam failure recovery request, it may need to know whether this request has been successfully received by gNB. Thus, a set of UE monitoring mechanisms should be introduced. Like response window of RACH, the network could configure a response window for the UE to monitor a response for its recovery request.

In a ninth embodiment of the disclosure, it is thus contemplated that the network can configure a response window where the UE monitors response to the beam failure recovery request transmission.

It is possible that gNB fails to detect the request because of poor signal quality. Therefore, the UE may not receive a response within the response window. For robust operation, the retransmission mechanism of beam recovery request should be supported. Specifically, if the UE does not receive a response within the response window, it will send an indicator to L2 and the MAC will trigger the retransmission of the request.

In a tenth embodiment of the disclosure, it is thus contemplated that, if the UE does not receive a response within the response window, then the UE can (re)transmit the beam failure recovery request.

If the UE has retransmitted too many times, but still could not get the response within the response window, it may indicate that the UE is in poor radio condition or the UE has lost the synchronization with gNB. In this case, it will be radio resource inefficient if UE continue the retransmission of request. Therefore, the network may need to configure a maximum number of attempts for the beam failure recovery request transmissions (similar to RACH attempts in LTE).

In an eleventh embodiment of the disclosure, it is thus contemplated that the network can configure the UE with a maximum number of attempts for the purpose of beam failure recovery request (re)transmissions: 1) the network can configure the UE to try a maximum of m1 attempts over beam-swept PUCCH (similar to SR procedure in LTE); or 2) the network shall configure the UE to try a maximum of m2 attempts over non-contention based channel based on PRACH and contention based PRACH resource (similar to regular RACH procedure).

Exemplary Scheduling Entity Design

Figure 7:
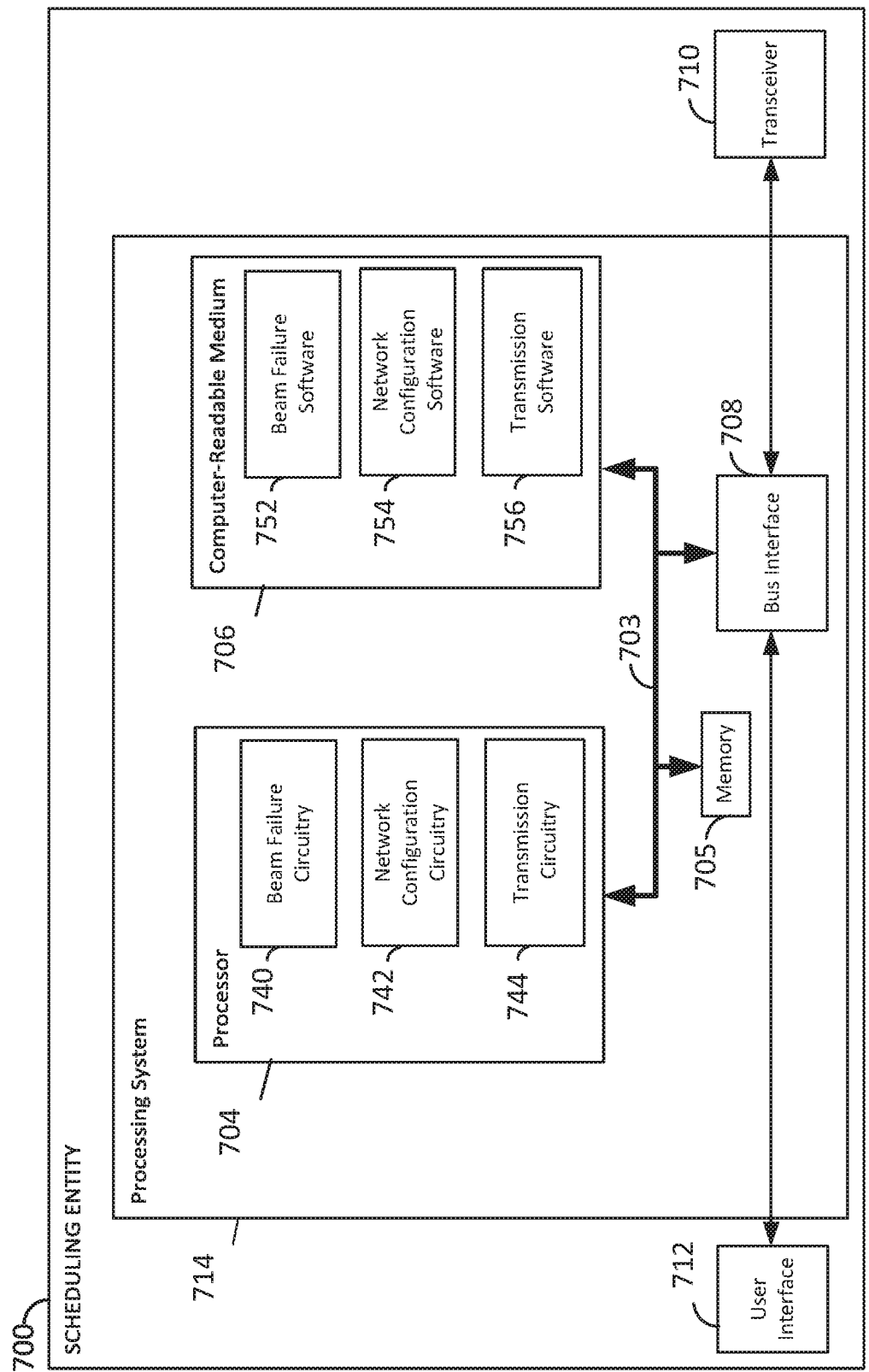
FIG. 7 is a block diagram illustrating an example of a hardware implementation for a scheduling entity employing a processing system according to some aspects of the disclosure.

FIG. 7 is a block diagram illustrating an example of a hardware implementation for a scheduling entity 700 employing a processing system 714. For example, the scheduling entity 700 may be a base station (e.g., eNB, gNB) as illustrated in any one or more of FIGS. 1, 2, and/or 5A-5G.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes and procedures described below and illustrated in FIGS. 5A-5G, as well as the process illustrated in FIG. 9.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick, touchscreen) may also be provided.

In some aspects of the disclosure, the processor 704 may include a beam failure circuitry 740 configured for various functions, including, for example, to determine beam failure conditions associated with detecting a beam failure. For instance, beam failure circuitry 740 may include logic circuitry coupled to a memory component (e.g., memory 705 and/or computer-readable medium 706), wherein the beam failure circuitry 740 may be configured to define and/or retrieve any of a plurality of parameters associated with detecting a beam failure (e.g., such parameters may be defined via user interface 712). As illustrated, the processor 704 may also include network configuration circuitry 742 configured for various functions. For instance, network configuration circuitry 742 may be configured to ascertain a network configuration for a scheduled entity. For instance, network configuration circuitry 742 may include logic circuitry coupled to a memory component (e.g., memory 705 and/or computer-readable medium 706), wherein the network configuration circuitry 742 may be configured to ascertain a network configuration based on any of a plurality of parameters (e.g., such parameters may be defined via user interface 712). In a particular embodiment, it is contemplated that the network configuration may include the aforementioned parameters associated with the beam failure conditions, as well as parameters associated with determining one or more beam failure recovery resources to utilize to transmit a beam failure recovery request. The processor 704 may further include transmission circuitry 744 configured for various functions, including, for example, to transmit the network configuration to the scheduled entity. Here, it should be appreciated that transmission circuitry 744 may include logic circuitry coupled to transceiver 710, wherein such logic circuitry may be configured to determine if and when to transmit the network configuration to one or more scheduled entities via transceiver 710.

Various other aspects for scheduling entity 700 are also contemplated. For instance, the transmission circuitry 744 may be configured to transmit the network configuration via radio resource control (RRC) signaling (e.g., the configuration may be enabled/disabled using Layers 1 and 2). The transmission circuitry 744 may also be configured to transmit the network configuration to a plurality of scheduled entities, and the network configuration circuitry 742 may be configured to ascertain a different network configuration for different scheduled entities. Such configuration may be traffic dependent, i.e., to reduce beam recovery delay, wherein the scheduling entity 700 may configure a subset of scheduled entities with uplink (UL) resources that are more frequent. It is also contemplated that such configuration may include configuring scheduled entities that have a high signal-to-noise ratio (SNR) to use any beam on the UL.

Referring back to the remaining components of scheduling entity 700, it should be appreciated that the processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may include beam failure software 752 configured for various functions, including, for example, to determine beam failure conditions associated with detecting a beam failure. As illustrated, the computer-readable storage medium 706 may also include network configuration software 754 configured for various functions. For instance, the network configuration software 754 may be configured to ascertain a network configuration for a scheduled entity. Here, it is contemplated that the network configuration may include the aforementioned parameters associated with the beam failure conditions, as well as parameters associated with determining one or more beam failure recovery resources to utilize to transmit a beam failure recovery request. The computer-readable storage medium 706 may further include transmission software 756 configured for various functions, including, for example, to transmit the network configuration to the scheduled entity.

Various other aspects for computer-readable storage medium 706 are also contemplated. For instance, the transmission software 756 may be configured to transmit the network configuration via radio resource control (RRC) signaling (e.g., the configuration may be enabled/disabled using Layers 1 and 2). The transmission software 756 may also be configured to transmit the network configuration to a plurality of scheduled entities, and the network configuration software 754 may be configured to ascertain a different network configuration for different scheduled entities.

In a particular configuration, it is also contemplated that the scheduling entity 700 includes means for determining beam failure conditions associated with detecting a beam failure; means for ascertaining a network configuration for a scheduled entity; and means for transmitting the network configuration to the scheduled entity. In one aspect, the aforementioned means may be the processor(s) 704 configured to perform the functions recited by the aforementioned means. In another aspect, the aforementioned means may be a circuit or any apparatus configured to perform the functions recited by the aforementioned means.

Figure 9:
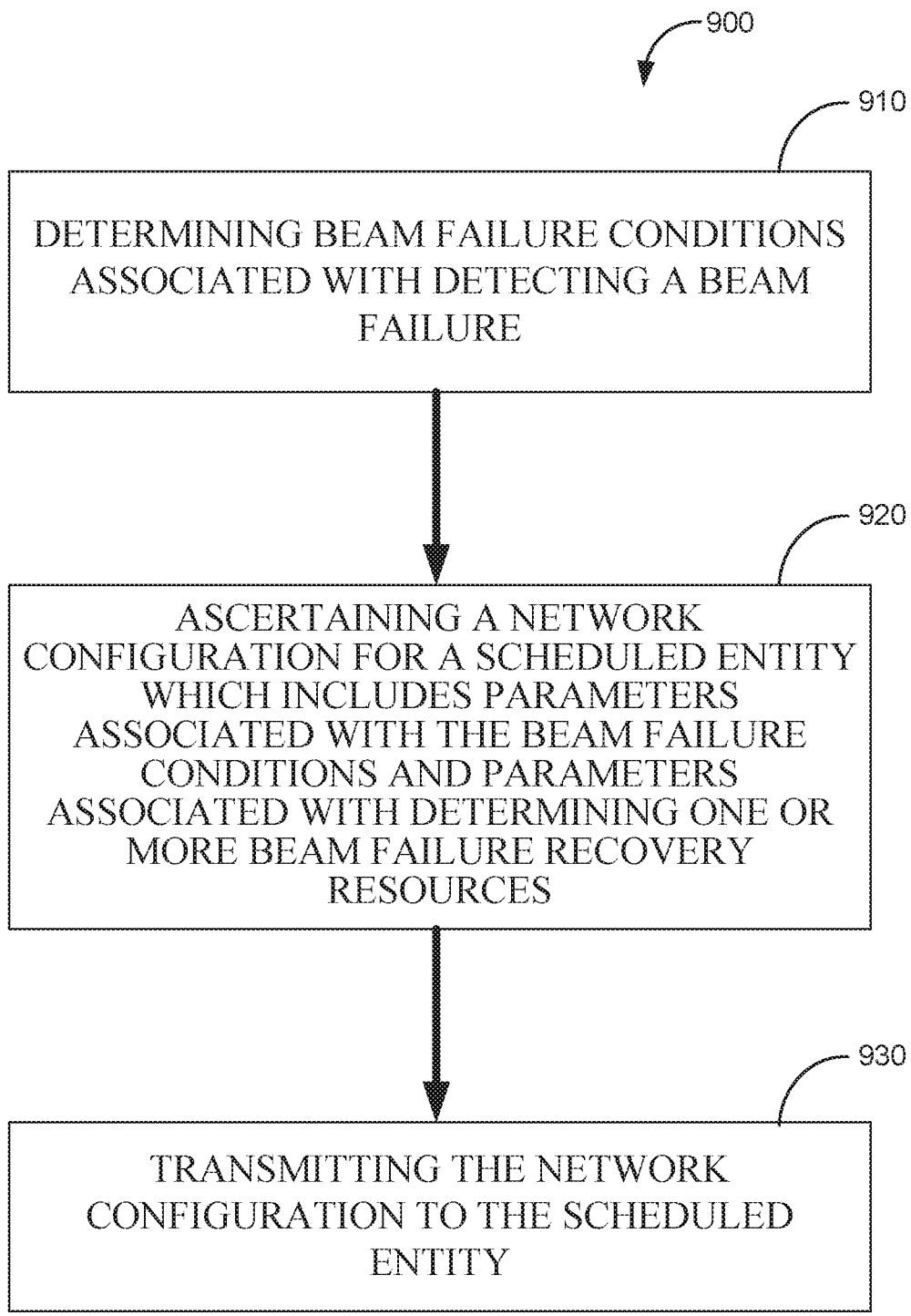
FIG. 9 is a flow chart illustrating an exemplary process operable at a scheduling entity for configuring a scheduled entity to select resources to transmit a beam failure recovery request according to some aspects of the disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described herein and utilizing, for example, the processes and/or algorithms described in relation to FIG. 9.

Figure 8:
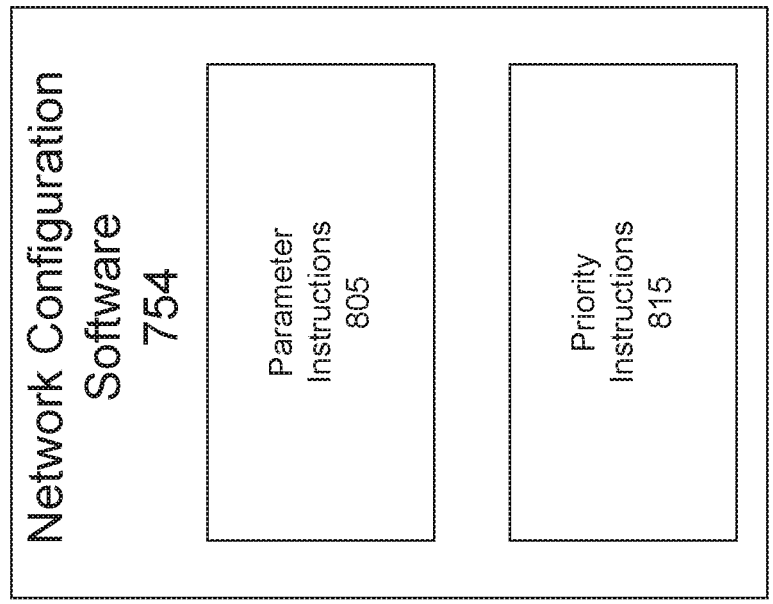
FIG. 8 is a block diagram illustrating exemplary subcomponents corresponding to the scheduling entity illustrated in FIG. 7.
Figure 8:
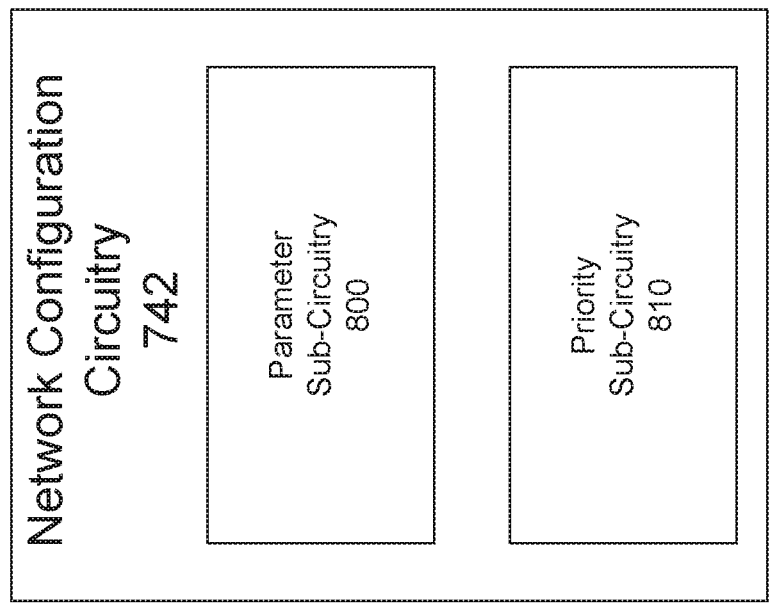

Referring next to FIG. 8, exemplary sub-components of network configuration circuitry 742 and network configuration software 754 are provided. As illustrated, network configuration circuitry 742 may comprise parameter sub-circuitry 800 and priority sub-circuitry 810; whereas network configuration software 754 may comprise parameter instructions 805 and priority instructions 815.

In a particular implementation, it is contemplated that parameter sub-circuitry 800 and/or parameter instructions 805 are configured to determine at least one parameter to include in the network configuration. For instance, it is contemplated that the network configuration may specify at least one of a system frame number (SFN), a sub-frame indicator (SFI), a periodicity, or resource elements (REs) associated with the beam failure recovery resources. In a particular example, the number of REs configured per uplink beam may vary depending on the number of users in the beam. in another example, the network may configure more frequency or time resources in certain beams for larger payloads. In yet another example, it is contemplated that these resources may be in a region other than the random access channel (RACH).

In a further aspect of the disclosure, it is contemplated that the network configuration may specify at least one of a quasi-coloration (QCL) or time relation between downlink beams and the beam failure recovery resources. For instance, it is contemplated that downlink beams may be based on one or more of a new radio synchronous signal (NR-SS), a mobility reference signal (MRS), or a channel state information reference signal (CSI-RS).

In another aspect of the disclosure, the network configuration may specify link quality conditions in which the scheduled entity is to perform a forward handover or conditional handover to another cell. For instance, such handover may be performed if an estimated link quality corresponding to a hypothetical PDCCH BLER based on all or a subset of configured X RLM-RS resource(s) is below a Q_out threshold.

It is further contemplated that parameter sub-circuitry 800 and/or parameter instructions 805 may be configured to determine various other parameters to include in the network configuration. For instance, parameter sub-circuitry 800 and/or parameter instructions 805 may be configured to have the network configuration include a timer parameter to facilitate a detection of the beam failure. In another embodiment, parameter sub-circuitry 800 and/or parameter instructions 805 may be configured to have the network configuration include a candidate beam threshold parameter to facilitate beam failure recovery, wherein the candidate beam threshold parameter corresponds to a received power threshold associated with a candidate beam. In yet another embodiment, parameter sub-circuitry 800 and/or parameter instructions 805 may be configured to have the network configuration include a time window parameter to facilitate beam failure recovery, wherein the time window parameter corresponds to a time window for monitoring a response to the beam failure recovery request.

It is also contemplated that priority sub-circuitry 810 and/or priority instructions 815 may be configured to determine a priority to include in the network configuration. Here, such priority may facilitate a scheduled entity's determination of one or more beam failure recovery resources to utilize to transmit the beam failure recovery request. For instance, a first priority may be given to a non-contention based channel based on the physical layer random access channel (PRACH), which uses a resource orthogonal to resources of other PRACH transmissions (FDM/TDM/CDM). For this example, if beams in first priority channels are not suitable, the scheduled entity may find a suitable beam in second priority uplink (UL) resources, which may be in a contention-free region. And finally, as a lesser priority, the scheduled entity may select a contention-based channel for the transmission of beam failure recovery request.

With respect to the particular priority included in the network configuration transmitted to the scheduled entity, it should be appreciated that such priority scheme may be based on any of various parameters. For instance, such priority may comprise selecting the beam failure recovery resources according to which of dedicated, contention-free, or common resources is first available. The priority may also comprise an exception if one or more beams belonging to a different priority are deemed to have a quality above a network configured threshold. Moreover, the scheduling entity 700 may configure the scheduled entity to (or the scheduled entity may be configured to autonomously) break a priority rule if one or more beams belonging to different priorities becomes significantly better, than the other beams by an offset or above a network configured threshold.

It another aspect, priority sub-circuitry 810 and/or priority instructions 815 may be configured to have the network configuration specify a priority of using beams within the resources for beam failure recovery. The network configuration may also specify a threshold number of attempts for selecting a particular channel to transmit the beam failure recovery request (i.e., after which, the scheduled entity is allowed to select any channel or those in the next priority for a beam failure recovery request transmission). Similarly, the network configuration may specify a threshold amount of time for selecting a particular channel to transmit the beam failure recovery request (i.e., after the expiry of the timer, the scheduled entity is allowed to select any channel or those in the next priority for a beam failure recovery request transmission). The network configuration may also specify a threshold amount of time between retransmissions of the beam failure recovery request (i.e., after each transmission, the scheduled entity shall back-off based on a time pattern specified or provided by the network, for instance). Similarly, the network configuration may specify that the scheduled entity should slow down the (re)transmissions of such requests.

In FIG. 9, a flow chart is provided, which illustrates an exemplary scheduling entity process according to some aspects of the disclosure. As described below, some or all illustrated features may be omitted in a particular implementation within the scope of the present disclosure, and some illustrated features may not be required for implementation of all embodiments. In some examples, the process 900 may be carried out by the scheduling entity 700 illustrated in FIG. 7. In some examples, the process 900 may be carried out by any suitable apparatus or means for carrying out the functions or algorithm described below.

Process 900 begins at block 910 with the determining of beam failure conditions associated with detecting a beam failure, and continues at block 920 with the ascertaining of a network configuration for a scheduled entity which includes parameters associated with the beam failure conditions and parameters associated with determining one or more beam failure recovery resources. Process 900 then concludes at block 930 with the transmitting of the network configuration to the scheduled entity.

Exemplary Scheduled Entity Design

Figure 10:
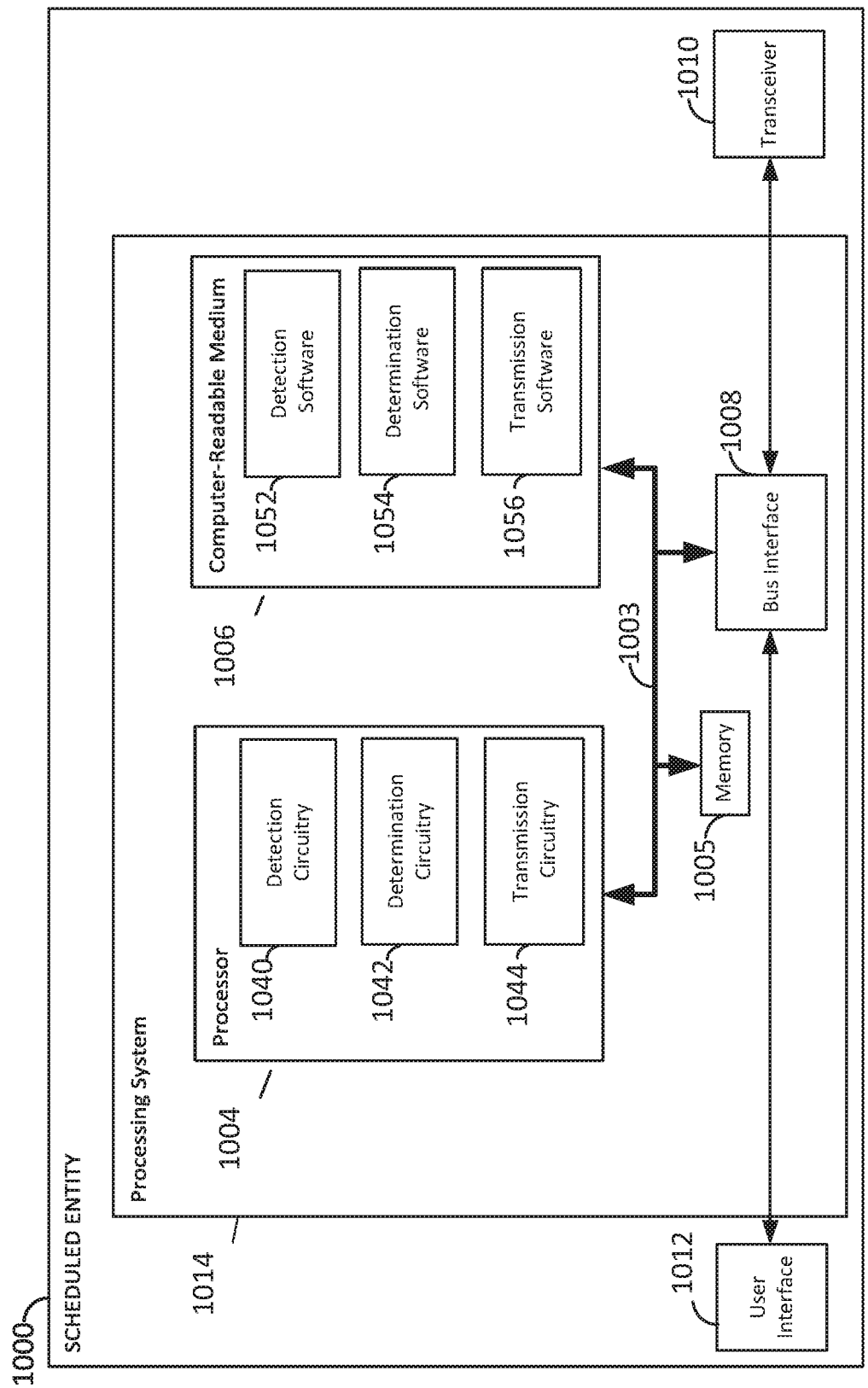
FIG. 10 is a block diagram illustrating an example of a hardware implementation for a scheduled entity employing a processing system according to some aspects of the disclosure.

FIG. 10 is a conceptual diagram illustrating an example of a hardware implementation for an exemplary scheduled entity 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in any one or more of FIGS. 1, 2, and/or 5A-5G.

The processing system 1014 may be substantially the same as the processing system 714 illustrated in FIG. 7, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 7. That is, the processor 1004, as utilized in a scheduled entity 1000, may be used to implement any one or more of the processes described below and illustrated in the various figures.

In some aspects of the disclosure, the processor 1004 may include a detection circuitry 1040 configured for various functions, including, for example, to detect a beam failure of a beam used for communication between devices. For instance, detection circuitry 1040 may include sensors coupled to transceiver 1010, wherein such sensors may be configured to detect when the signal quality or strength of a beam is below a predetermined threshold or not detected at all. As illustrated, the processor 1004 may also include determination circuitry 1042 configured for various functions. For instance, the determination circuitry 1042 may be configured to determine one or more beam failure recovery resources to utilize to transmit a beam failure recovery request, wherein the beam failure recovery resources are determined based at least partially on a network configuration of the scheduled entity 1000. For instance, determination circuitry 1042 may include logic circuitry coupled to a memory component (e.g., memory 1005 and/or computer-readable medium 1006), wherein the logic circuitry may be configured to determine one or more beam failure recovery resources based at least partially on a network configuration stored in memory 1005 and/or computer-readable medium 1006. Here, it should be appreciated that determination circuitry 1042 may also include various other components (e.g., a timer, a counter, etc.) to facilitate additional aspects disclosed herein. The processor 1004 may further include transmission circuitry 1044 configured for various functions, including, for example, to transmit the beam failure recovery request via the beam failure recovery resources determined according to the network configuration. To this end, it should be appreciated that transmission circuitry 1044 may include logic circuitry coupled to transceiver 1010, wherein such logic circuitry may be configured to determine if and when to transmit the beam failure recovery request via transceiver 710 in accordance with the network configuration.

Various other aspects for scheduled entity 1000 are also contemplated. For instance, scheduled entity 1000 may be configured to receive the network configuration via radio resource control (RRC) signaling. Within such embodiments, the configuration may be enabled/disabled using Layers 1 and 2.

Referring back to the remaining components of scheduled entity 1000, similar to processor 704, processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. Similar to computer-readable medium 706, computer-readable medium 1006 may be a non-transitory computer-readable medium comprising characteristics that are substantially similar. The computer-readable medium 1006 may reside in the processing system 1014, external to the processing system 1014, or distributed across multiple entities including the processing system 1014. It should also be appreciated that, similar to computer-readable medium 706, computer-readable medium 1006 may be embodied in a computer program product comprising characteristics that are substantially similar.

In one or more examples, the computer-readable storage medium 1006 may include detection software 1052 configured for various functions, including, for example, to detect a beam failure of a beam used for communication between devices. As illustrated, the computer-readable storage medium 1006 may also include determination software 1054 configured for various functions. For instance, the determination software 1054 may be configured to determine one or more beam failure recovery resources to utilize to transmit a beam failure recovery request, wherein the beam failure recovery resources are determined based at least partially on a network configuration of the scheduled entity 1000. The computer-readable storage medium 1006 may further include transmission software 1056 configured for various functions, including, for example, to transmit the beam failure recovery request via the beam failure recovery resources determined according to the network configuration.

In a particular configuration, it is also contemplated that the scheduled entity 1000 includes means for detecting a beam failure of a beam used for communication between devices; means for determining one or more beam failure recovery resources to utilize to transmit a beam failure recovery request; and means for transmitting the beam failure recovery request via the beam failure recovery resources. In one aspect, the aforementioned means may be the processor(s) 1004 configured to perform the functions recited by the aforementioned means. In another aspect, the aforementioned means may be a circuit or any apparatus configured to perform the functions recited by the aforementioned means.

Figure 12:
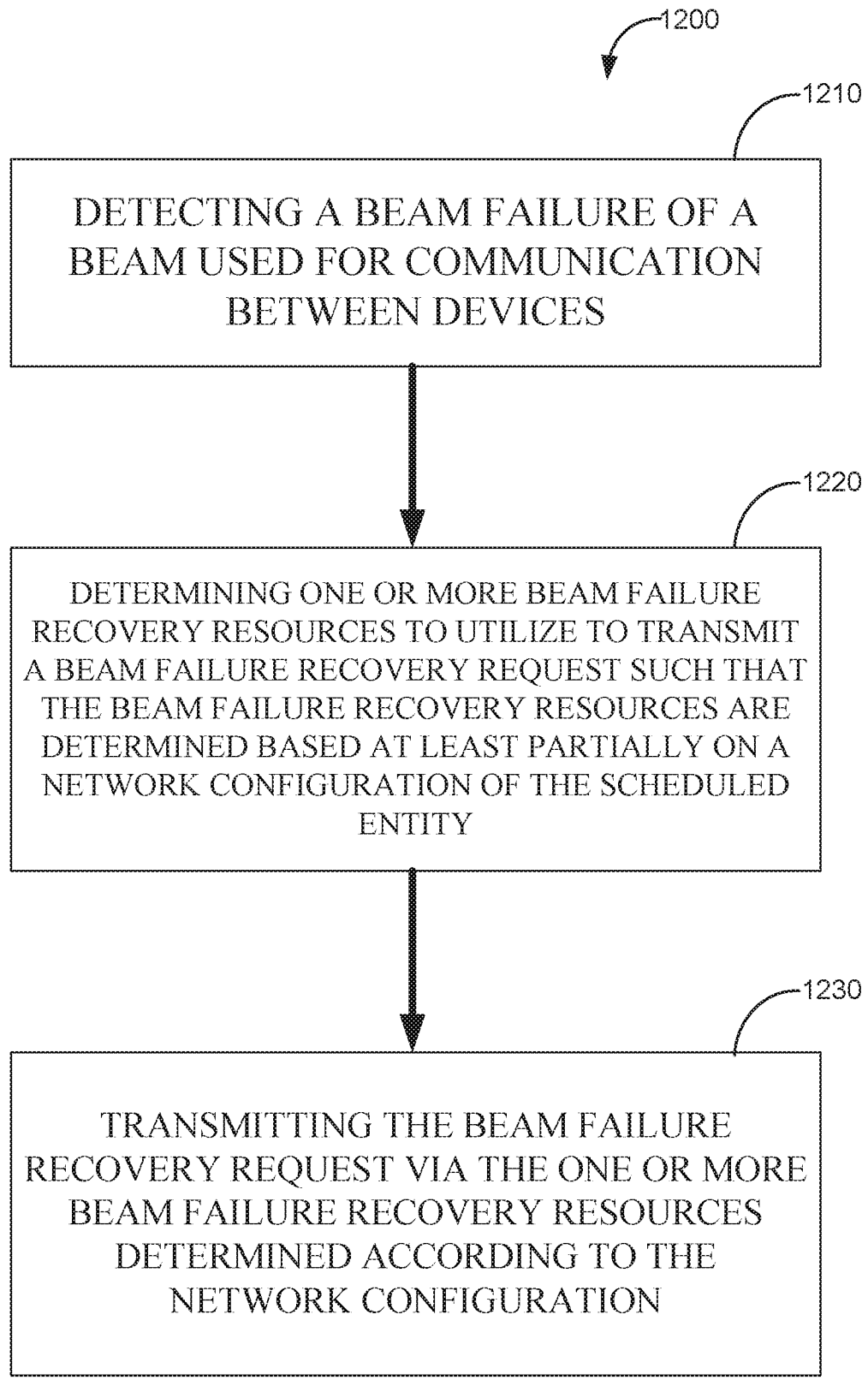
FIG. 12 is a flow chart illustrating an exemplary process operable at a scheduled entity for selecting resources to transmit a beam failure recovery request according to some aspects of the disclosure.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described herein and utilizing, for example, the processes and/or algorithms described in relation to FIG. 12.

Figure 11:
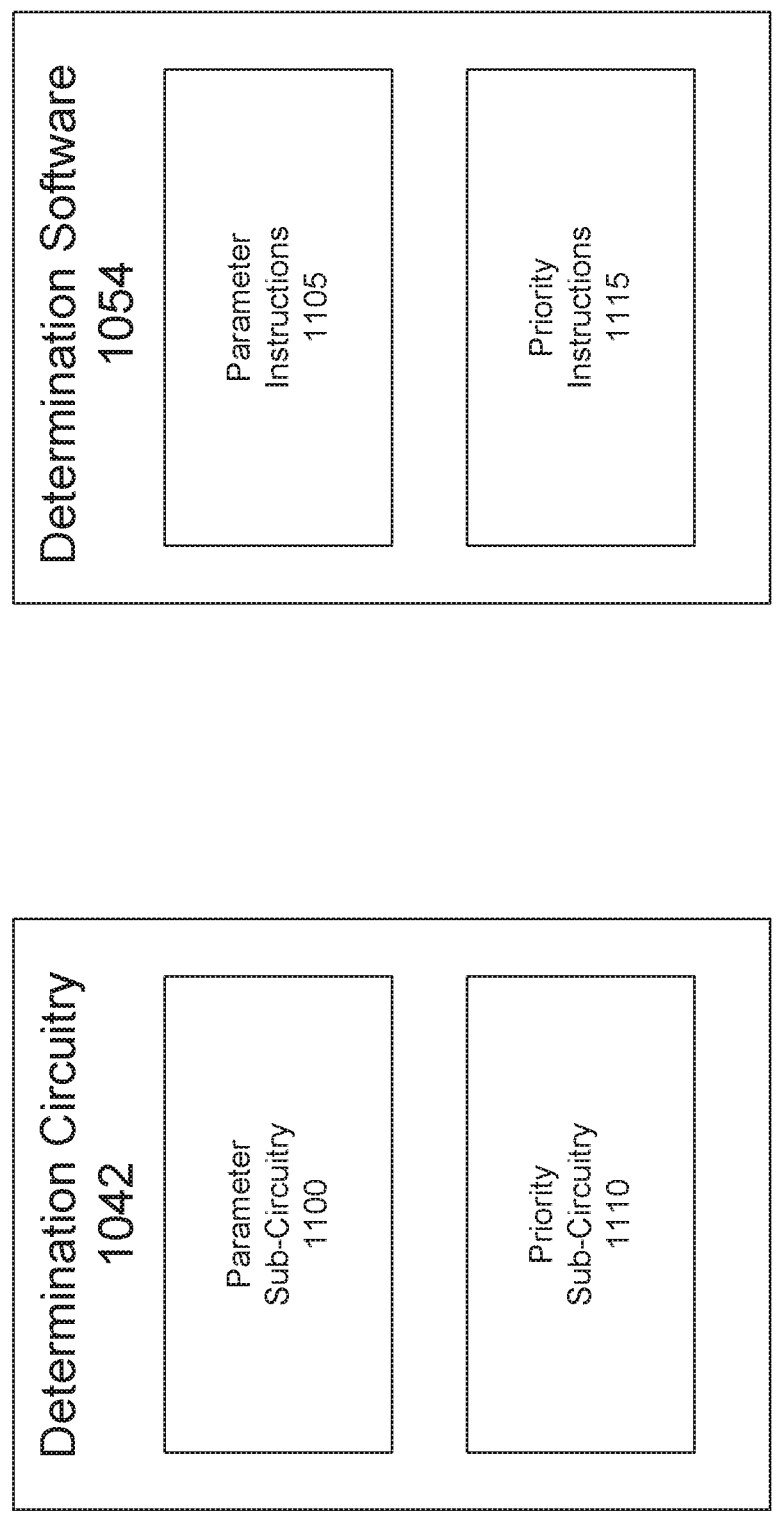
FIG. 11 is a block diagram illustrating exemplary subcomponents corresponding to the scheduled entity illustrated in FIG. 10.

Referring next to FIG. 11, exemplary sub-components of determination circuitry 1042 and determination software 1054 are provided. As illustrated, determination circuitry 1042 may comprise parameter sub-circuitry 1100 and priority sub-circuitry 1110; whereas determination software 1054 may comprise parameter instructions 1105 and priority instructions 1115.

In a particular implementation, it is contemplated that the network configuration may specify any of various parameters associated with the beam failure recovery resources. For instance, it is contemplated that parameter sub-circuitry 1100 and/or parameter instructions 1105 are configured to determine at least one of a system frame number (SFN), a sub-frame indicator (SFI), a periodicity, or resource elements (REs) associated with the beam failure recovery resources based on parameters indicated in the network configuration. In a particular example, the number of REs configured per uplink beam may vary depending on the number of users in the beam. In another example, the network may configure more frequency or time resources in certain beams for larger payloads. In yet another example, it is contemplated that these resources may be in a region other than the random access channel (RACH).

In a further aspect of the disclosure, it is contemplated that the network configuration may specify at least one of a quasi-collocation (QCL) or time relation between downlink beams and the beam failure recovery resources. For instance, it is contemplated that downlink beams may be based on one or more of a new radio synchronous signal (NR-SS), a mobility reference signal (MRS), or a channel state information reference signal (CSI-RS).

In another aspect of the disclosure, the network configuration may specify link quality conditions in which the scheduled entity 1000 is to perform a forward handover or conditional handover to another cell. For instance, such handover may be performed if an estimated link quality corresponding to a hypothetical PDCCH BUR based on all or a subset of configured X RLM-RS resource(s) is below a Q_out threshold.

It is further contemplated that parameter sub-circuitry 1100 and/or parameter instructions 1105 may be configured to determine various other parameters included in the network configuration. For instance, parameter sub-circuitry 1100 and/or parameter instructions 1105 may be configured to determine a timer parameter to facilitate a detection of the beam failure. In another embodiment, parameter sub-circuitry 1100 and/or parameter instructions 1105 may be configured to determine a candidate beam threshold parameter to facilitate beam failure recovery, wherein the candidate beam threshold parameter corresponds to a received power threshold associated with a candidate beam. In yet another embodiment, parameter sub-circuitry 1100 and/or parameter instructions 1105 may be configured to determine a time window parameter to facilitate beam failure recovery, wherein the time window parameter corresponds to a time window for monitoring a response to the beam failure recovery request.

It is also contemplated that priority sub-circuitry 1110 and/or priority instructions 1115 may be configured to determine a priority associated with determining the one or more beam failure recovery resources to utilize to transmit the beam failure recovery request, wherein the priority sub-circuitry 1110 and/or priority instructions 1115 may be configured to determine the priority based on a priority indicated in the network configuration. For instance, a first priority may be given to a non-contention based channel based on the physical layer random access channel (PRAM), which uses a resource orthogonal to resources of other PRAM transmissions (FDM/TDM/CDM). For this example, if beams in first priority channels are not suitable, the scheduled entity 1000 may find a suitable beam in second priority uplink (UL) resources, which may be in a contention-free region. And finally, as a lesser priority, the scheduled entity 1000 may select a contention-based channel for the transmission of beam failure recovery request.

With respect to the particular priority included in the network configuration received by the scheduled entity 1000, it should be appreciated that such priority may be based on any of various parameters. For instance, such priority may comprise selecting the beam failure recovery resources according to which of dedicated, contention-free, or common resources is first available. The priority may also comprise an exception if one or more beams belonging to a different priority are deemed to have a quality above a network configured threshold. Moreover, the scheduled entity 1000 may be configured to (or the scheduled entity may be configured to autonomously) break a priority rule if one or more beams belonging to different priorities becomes significantly better, than the other beams by an offset or above a network configured threshold.

It another aspect, the priority of using beams within the resources for beam failure recovery may be specified by the network configuration. The network configuration may also specify a threshold number of attempts for selecting a particular channel to transmit the beam failure recovery request (i.e., after which, the scheduled entity 1000 is allowed to select any channel or those in the next priority for a beam failure recovery request transmission). Similarly, the network configuration may specify a threshold amount of time for selecting a particular channel to transmit the beam failure recovery request (i.e., after the expiry of the timer, the scheduled entity 1000 is allowed to select any channel or those in the next priority for a beam failure recovery request transmission). The network configuration may also specify a threshold amount of time between retransmissions of the beam failure recovery request (i.e., after each transmission, the scheduled entity 1000 shall back-off based on a time pattern specified or provided by the network, for instance). Similarly, the network configuration may specify that the scheduled entity 1000 should slow down the (re)transmissions of such requests.

In FIG. 12, a flow chart is provided, which illustrates an exemplary scheduled. entity process according to some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduled entity 1000 illustrated in FIG. 10. In some examples, the process 1200 may be carried out by any suitable apparatus or means for carrying out the functions or algorithm described below.

Process 1200 begins at block 1210 with the detecting of a beam failure of a beam used for communication between devices, and continues at block 1220 with the determining of one or more beam failure recovery resources to utilize to transmit a beam failure recovery request. Here, the beam failure recovery resources are determined at block 1220 based at least partially on a network configuration of the scheduled entity. Process 1200 then concludes at block 1230 with the transmitting of the beam failure recovery request via the one or more beam failure recovery resources determined. according to the network configuration at block 1220.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi). IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration," Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including; single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduled entity, comprising:
   obtaining beam failure recovery information that comprises at least one timing parameter to utilize during a beam failure event;
   determining, based on the beam failure recovery information, at least one recovery resource to communicate a plurality of uplink messages during the beam failure event, wherein determining the at least one recovery resource comprises utilizing an index to determine the at least one recovery resource and wherein the at least one recovery resource includes a contention-based resource; and
   transmitting the plurality of uplink messages using the at least one recovery resource according to the at least one timing parameter.

2. The method of claim 1, wherein transmitting the plurality of uplink messages according to the at least one timing parameter comprises:
   transmitting the plurality of uplink messages in accordance with a predetermined uplink transmission rate.

3. The method of claim 2, wherein transmitting the plurality of uplink messages in accordance with the predetermined uplink transmission rate comprises:
   applying a rate adjustment factor to the predetermined uplink transmission rate to scale the predetermined uplink transmission rate at the scheduled entity over time.

4. The method of claim 2, further comprising:
   determining a time pattern from the at least one timing parameter; and
   transmitting the plurality of uplink messages in accordance with the time pattern.

5. The method of claim 1, wherein the at least one recovery resource includes a preamble corresponding to a particular communication beam.

6. The method of claim 1, wherein the plurality of uplink messages include at least one recovery request.

7. The method of claim 6, wherein the plurality of uplink messages includes a beam adjustment request, the beam adjustment request comprising a request for a transmission of a beam refinement reference signal.

8. The method of claim 1, wherein the at least one recovery resource comprises one or more elements configured to indicate uplink control information to a scheduling entity.

9. The method of claim 8, wherein the uplink control information includes a scheduling request.

10. The method of claim 1, wherein the at least one recovery resource corresponds to at least one frequency division multiplexed channel.

11. The method of claim 1, further comprising:
    receiving a message comprising configuration information via radio resource control (RRC) signaling, wherein the configuration information includes the beam failure recovery information.

12. The method of claim 1, further comprising:
    detecting a failure of an active communication beam; and
    providing, in response to the failure of the active communication beam, a recovery request message with at least a first uplink message within the plurality of uplink messages.

13. The method of claim 12, wherein detecting the failure of the active communication beam comprises:
    detecting the failure of the active communication beam on a synchronization signal block (SS-block).

14. The method of claim 1, further comprising:
    utilizing a beam identification reference signal to locate a candidate recovery beam used to facilitate recovery from the beam failure event; and
    providing candidate recovery beam information within at least one uplink message of the plurality of uplink messages.

15. The method of claim 14, wherein the beam identification reference signal includes a periodic channel state information reference signal (CSI-RS) configured for beam management.

16. The method of claim 1, further comprising:
    determining an unsuccessful recovery from the beam failure event; and
    indicating the unsuccessful recovery to a higher layer entity.

17. The method of claim 16, wherein determining the unsuccessful recovery comprises:
determining a plurality of unsuccessful delivery attempts of the plurality of uplink messages.

18. The method of claim 16, wherein determining the unsuccessful recovery comprises:
determining an expiration of a recovery timer.

19. An apparatus for wireless communication at a scheduled entity, the apparatus comprising:
one or more processors; and
a transceiver communicatively coupled to the one or more processors;
wherein the one or more processors are coupled to a memory and configured to cause the apparatus to:
access beam failure recovery information that comprises at least one timing parameter for the processor to utilize during a beam failure event;
determine, based on the beam failure recovery information, at least one recovery resource that the processor and transceiver are to utilize during the beam failure event, wherein to determine the at least one recovery resource the processor is configured to utilize an index to determine the at least one recovery resource and wherein the at least one recovery resource includes a contention-based resource; and
provide a plurality of uplink transmissions using the at least one recovery resource according to the at least one timing parameter that the processor utilizes to time each consecutive uplink transmission in the plurality of uplink transmissions, wherein the at least one timing parameter comprises one or more of:
a maximum number of uplink transmissions in the plurality of uplink transmissions to be transmitted on the at least one recovery resource;
a retransmission time between a transmitting first uplink message of the plurality of uplink transmissions and transmitting a second uplink message of the plurality of uplink transmissions on the at least one recovery resource; or
a maximum amount of time for transmitting the plurality of uplink transmissions using the at least one recovery resource.

20. The apparatus of claim 19, wherein to provide the plurality of uplink transmissions according to the at least one timing parameter, the one or more processors are further configured to cause the apparatus to:
provide the plurality of uplink transmissions in accordance with a predetermined uplink transmission rate.

21. The apparatus of claim 20, wherein to provide the plurality of uplink transmissions in accordance with the predetermined uplink transmission rate, the one or more processors are further configured to cause the apparatus to:
apply a rate adjustment factor to the predetermined uplink transmission rate to scale the predetermined uplink transmission rate at the scheduled entity over time.

22. The apparatus of claim 20, wherein the one or more processors are further configured to cause the apparatus to:
determine a time pattern from the at least one timing parameter; and
provide the plurality of uplink transmissions in accordance with the time pattern.

23. The apparatus of claim 19, wherein the at least one recovery resource includes a preamble corresponding to a particular communication beam.

24. The apparatus of claim 19, wherein the plurality of uplink transmissions includes at least one recovery request.

25. The apparatus of claim 24, wherein the plurality of uplink transmissions includes a beam adjustment request, the beam adjustment request comprising a request for a transmission of a beam refinement reference signal.

26. The apparatus of claim 19, wherein the at least one recovery resource comprises one or more elements configured to carry uplink control information to a scheduling entity.

27. The apparatus of claim 26, wherein the uplink control information includes a scheduling request.

28. The apparatus of claim 19, wherein the at least one recovery resource corresponds to at least one frequency division multiplexed channel.

29. The apparatus of claim 19, wherein the one or more processors are further configured to cause the apparatus to:
receive a message comprising configuration information via radio resource control (RRC) signaling, wherein the configuration information includes the beam failure recovery information; and
store to the memory at least a portion of the beam failure recovery information.

30. The apparatus of claim 19, wherein the one or more processors are further configured to cause the apparatus to:
detect a failure of an active communication beam; and
provide, in response to the failure of the active communication beam, a recovery request message with at least a first uplink transmission within the plurality of uplink transmissions.

31. The apparatus of claim 30, wherein to detect the failure of the active communication beam, the one or more processors are further configured to cause the apparatus to:
detect the failure of the active communication beam on a synchronization signal block (SS-block).

32. The apparatus of claim 19, wherein the one or more processors are further configured to cause the apparatus to:
utilize a beam identification reference signal to locate a candidate recovery beam used to facilitate recovery from the beam failure event; and
provide candidate recovery beam information within at least one uplink transmission of the plurality of uplink transmissions.

33. The apparatus of claim 32, wherein the beam identification reference signal includes a periodic channel state information reference signal (CSI-RS) configured for beam management.

34. The apparatus of claim 19, wherein the one or more processors are further configured to cause the apparatus to:
determine an unsuccessful recovery from the beam failure event; and
indicate the unsuccessful recovery to a higher layer entity.

35. The apparatus of claim 34, wherein to determine the unsuccessful recovery, the one or more processors are further configured to cause the apparatus to:
determine a plurality of unsuccessful delivery attempts of the plurality of uplink transmissions.

36. The apparatus of claim 34, wherein to determine the unsuccessful recovery, the one or more processors are further configured to cause the apparatus to:
determine an expiration of a recovery timer.

37. The method of claim 1, wherein the at least one timing parameter comprises one or more of:
a maximum number of uplink messages in the plurality of uplink messages to be transmitted using the at least one recovery resource;
a retransmission time between transmitting a first uplink message of the plurality of uplink messages and transmitting a second uplink message of the plurality of uplink messages using the at least one recovery resource; or a maximum amount of time for transmitting the plurality of uplink messages using the at least one recovery resource.

38. The method of claim 1, further comprising:
determining, based on the beam failure recovery information, a second recovery resource; and
after transmitting the plurality of uplink messages using the at least one recovery resource, transmitting at least one retransmission of an uplink message of the plurality of uplink messages using the second recovery resource.

39. The apparatus of claim 19, wherein the at least one timing parameter comprises one or more of:
a maximum number of uplink transmissions in the plurality of uplink transmissions to be transmitted using the at least one recovery resource;
a retransmission time between transmitting a first uplink transmission of the plurality of uplink transmissions and transmitting a second uplink transmission of the plurality of uplink transmissions using the at least one recovery resource; or a maximum amount of time for transmitting the plurality of uplink transmissions using the at least one recovery resource.

40. The apparatus of claim 19, wherein the one or more processors are further configured to cause the apparatus to:
determine, based on the beam failure recovery information, a second recovery resource; and
after providing the plurality of uplink transmissions using the at least one recovery resource, provide at least one retransmission of an uplink message of the plurality of uplink transmissions using the second recovery resource.

41. The method of claim 1, wherein the index comprises a beam index.

42. The apparatus of claim 19, wherein the index comprises a beam index.

43. The method of claim 1, wherein the index corresponds to the at least one recovery resource in a mapping or a table.

44. The apparatus of claim 19, wherein the index corresponds to the at least one recovery resource in a mapping or a table.

* * * * *